US012447998B2

(12) United States Patent
Thung et al.

(10) Patent No.: US 12,447,998 B2
(45) Date of Patent: Oct. 21, 2025

(54) EDGE DATA REDUCTION IN AUTOMOTIVE SYSTEMS

(71) Applicant: NATIONAL INSTRUMENTS CORPORATION, Austin, TX (US)

(72) Inventors: Stephen Thung, Norman, OK (US); Kyle Ross Bryson, Austin, TX (US); Walter Michael Altmann, Austin, TX (US); Peter Andrew Kurlak, Austin, TX (US)

(73) Assignee: National Instruments Corporation, Austin, TX (US)

( * ) Notice: Subject to any disclaimer, the term of this patent is extended or adjusted under 35 U.S.C. 154(b) by 173 days.

(21) Appl. No.: 18/506,483

(22) Filed: Nov. 10, 2023

(65) Prior Publication Data
US 2025/0115274 A1    Apr. 10, 2025

Related U.S. Application Data

(60) Provisional application No. 63/587,892, filed on Oct. 4, 2023.

(51) Int. Cl.
*B60W 60/00* (2020.01)
*G06V 20/56* (2022.01)

(52) U.S. Cl.
CPC .......... *B60W 60/001* (2020.02); *G06V 20/56* (2022.01); *B60W 2554/4041* (2020.02)

(58) Field of Classification Search
None
See application file for complete search history.

(56) References Cited

U.S. PATENT DOCUMENTS

| | | | |
|---|---|---|---|
| 11,698,910 B1* | 7/2023 | Zheng | B60W 60/001 707/723 |
| 12,093,869 B1* | 9/2024 | Kownacki | G06Q 10/0635 |
| 2018/0278894 A1* | 9/2018 | Kanga | H04N 7/188 |
| 2019/0256162 A1* | 8/2019 | Denholm | H04N 5/77 |

OTHER PUBLICATIONS

CARLA—Open source simulator for autonomous driving research; retrieved from <https://carla.org>; 2024; 4 pgs.

(Continued)

*Primary Examiner* — Donald J Wallace
*Assistant Examiner* — Paysun Wu
(74) *Attorney, Agent, or Firm* — Kowert, Hood, Munyon, Rankin & Goetzel, P.C.; Jeffrey C. Hood; Luke Langsjoen

(57) ABSTRACT

Methods, computing devices, and software programs for identifying a driving scenario in real-time driving data. A driving scenario is received and translated into an ordered sequence of events that correspond to the driving scenario. A signal computation function is determined for each event in the sequence, which quantifies proximity to the respective event. Driving data is received for a plurality of time steps. Values of each signal computation function are determined, evaluated for the driving data at each of the plurality of time steps. It is determined whether the driving scenario has occurred in the driving data based on the values of the signal computation function. A first portion of the driving data is either modified, discarded, or stored in memory based on the determination whether the driving scenario has occurred.

20 Claims, 41 Drawing Sheets

(56) References Cited

OTHER PUBLICATIONS

"Humanetics and Forestellix Bridge the Gap Between Virtual and Physical Test Flows for ADAS and ADS"; retrieved from <https://www.foretellix.com/humanetics-and-foretellix-bridge-the-gap-between-virtual-and-physical-test-flows-for-adas-and-ads/>; Foretellix; Mar. 16, 2021; Farmington Hills, MI, USA and Tel Aviv, Israel; 5 pgs.
Gil Amid, Foretellix Ltd.; "ASAM OpenSCENARIO V2.0"; retrieved from <https://www.asam.net/project-detail/asam-openscenario-v20-1/>; ASAM Associate for Standardization of Automation and Measuring Systems; 2022; 5 pgs.

\* cited by examiner

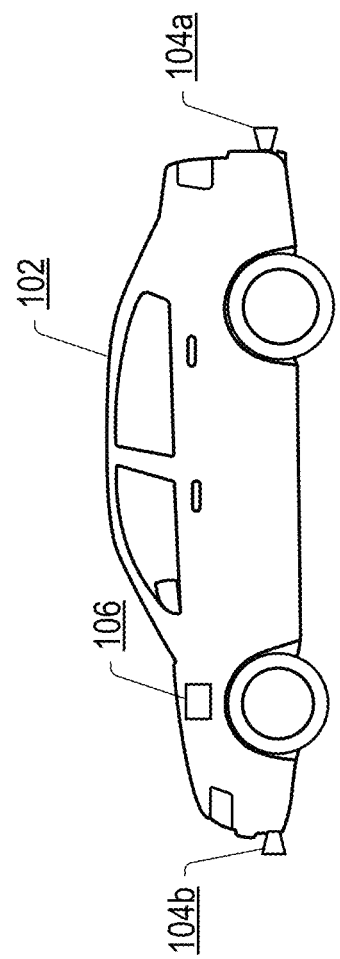
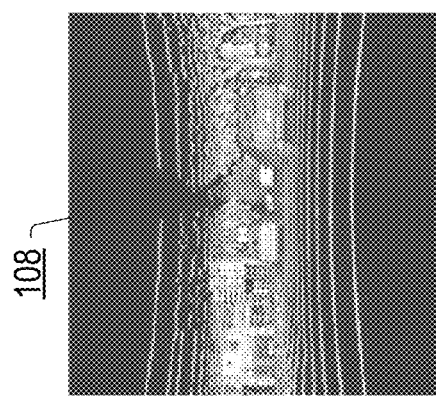
FIG. 1

| Unique ID | "Forward Movement Event" |
|---|---|
| Event Signal Computation Functions | signal (vehicle_list: Unbindable[list[Vehicle]], target_vehicle: uuid, target_speed: Optional[Speed] = None) -> float:<br>  target_vehicle_resolved <- select vehicle from vehicle_list where vehicle.uuid == target_vehicle<br>  If target_speed == None:<br>    return 1.0<br>  vehicle_speed <- target_vehicle_resolved.speed<br>  relative_abs_error = abs(target_speed - vehicle_Speed) / target_speed<br>  return 1.0 - min(relative_abs_error, 1) |
| Event Semantics | Defines movement of a vehicle at some speed (or speed range) longitudinally along a road (obeying standard laws of traffic flow) at some moment in time<br><br>Semantic Tags:<br>• @evt1_variable_declaration<br>• @evt1_expression(reference: Optional[evt1_variable_declaration])<br>• @evt1_event_declaration<br>• @evt1_target_vehicle(parent_tag: evt1_event_declaration)<br>• @evt1_target_speed(parent_tag: evt1_event_declaration)<br><br>Is not a "top-level event" ~ will not be incorporated into the state machine and output of signal computation will not be fed into tokenizer |

Example Diagram (1): Event 1

FIG. 10

Unique ID

"Relative Position Event"

Event Signal Computation Functions signal (target_vehicle: uuid, reference_vehicle: uuid, target_offset: Distance, direction: Direction, vehicle_list: list[Vehicle]) -> float Event Semantics Defines moment in time at which two vehicles are some distance apart in some direction Semantic Tags:
- @evt2_variable_declaration
- @evt2_expression(reference: Optional[evt2_variable_declaration])
- @evt2_event_declaration
- @evt2_target_vehicle(parent_tag: evt2_event_declaration)
- @evt2_reference_vehicle(parent_tag: evt2_event_declaration)
- @evt2_target_offset(parent_tag: evt2_event_declaration)
- @evt2_direction(parent_tag: evt2_event_declaration)

Is not a "top-level event" - will not be incorporated into the state machine and output of signal computation will not be fed into tokenizer

Example Diagram (2): Event 2

FIG. 11

Example Diagram (4): Event repository

Example Diagram (5): Event repository semantics

```
1: scenario vehicle_in_other_lane :
2:   other_vehicle: vehicle
3:   do parallel():
4:     sut.vehicle.drive()
5:     other_vehicle.drive() with:
6:       speed(speed: 75kph)
7:       lane(side_of: sut.vehicle, side: side)
8:
```

Line numbers are included for ease of reference. They are not part of the scenario

FIG. 15

Example Diagram (6): Scenario

```
01: scenario_declaration: "scenario" BASIC_IDENTIFIER ":" _NEWLINE _INDENT (parameter_declaration |
    do_directive)+ _DEDENT
02:
03: parameter_declaration: identifier ":" TYPE_DECLARATOR _NEWLINE
04:
05: do_directive: "do" do_member
06: do_member: [identifier ":"] ( composition | behavior_invocation )
07: composition: composition_operator "()":" _NEWLINE _INDENT do_member+ _DEDENT
08: composition_operator: "serial" | "parallel"
09:
10: behavior_invocation: [identifier "."] identifier "(" [argument_list] ")" (behavior_with_declaration |
    _NEWLINE)
11: behavior_with_declaration: "with" ":" _NEWLINE _INDENT modifier_application+ _DEDENT
12: modifier_application: identifier "(" [argument_list] ")" _NEWLINE
13: argument_list: named_argument (", " named_argument)*
14: named_argument: identifier ":" expression
15:
16: expression: primary_exp | field_access
17: field_access: expression "." identifier
18: primary_exp: physical_literal | identifier
19: physical_literal: INTEGER_LITERAL identifier
20:
21: identifier: SUT_IDENTIFIER | BASIC_IDENTIFIER
22: TYPE_DECLARATOR: "int" | "uint" | "float" | "bool" | "string" | "vehicle"
23: INTEGER_LITERAL: /[0-9]+/
24: SUT_IDENTIFIER.2: "sut.vehicle"
25: BASIC_IDENTIFIER.1: /[a-zA-z][a-zA-Z0-9_]*/
26:
27: %import common.WS_INLINE
28: %declare _INDENT _DEDENT
29: %ignore WS_INLINE
30:
31: _NEWLINE: /(\r?\n[\t ]*)+/
```

Example Diagram (7): Scenario description language grammar

FIG. 16

| Language structure | Semantics |
|---|---|
| scenario-declaration | Declares scenario. Nested structures are part of the scenario |
| parameter-declaration | Declaration of existence of an entity variable |
| type-declarator | Type of entity or variable |
| do-directive | Declares 1+ actions. Nested structures define actions |
| do-member | Declares an action |
| composite-operator | Declares the temporal relation between 1+ actions within a do-directive |
| behavior-invocation | Defines what performs an action and what the action is, such as movement of a vehicle |
| behavior-with-declaration | Declares 1+ modifiers for an action |
| modifier-application | Defines a modifier for an action – additional specification for constraints on how the action is performed. |

Example Diagram (8.1): Scenario description language semantics

FIG. 17A

| Language structure | Semantics |
|---|---|
| argument-list | Structure containing 1+ named arguments |
| named-argument | A uniquely identified (named) argument to a modifier with a value. Further constrains the modifier and thus further constrains how an action is performed. |
| expression | An evaluable term – either a resolvable reference to an identifier or a physical literal. |
| physical-literal | A number with a unit (e.g. 5 meters) |

FIG. 17B

Example Diagram (8.2): Scenario description language semantics cont.

Example Diagram (9): Scenario description language semantics translation

| Language structure | "Forward movement event"-compatible semantics |
|---|---|
| scenario-declaration | N/A |
| parameter-declaration | Declares a named, typed variable that may be referenced later. Name binds to @evt1_variable_declaration |
| type-declarator | Declares type of a variable |
| do-directive | N/A |
| do-member | Structure and its substructures may declare a "forward movement event" |
| composite-operator | N/A |
| behavior-invocation | If behavior is drive, declares a "forward movement event", binding to @ev1t_event_declaration. Actor on which the behavior invocation is called bound to @evt1_target_vehicle with the parent_tag parameter set to the evt1_event_declaration tag |
| behavior-with-declaration | Structure and its substructures may bind values to event signal computation function parameters |
| modifier-application | If identifier is "speed", value will bind to @evt1_target_speed. Value is determined by substructure. Else modifier is ignored |

FIG. 19A

Example: Event repo-compatible semantics

| Language structure | "Forward movement event"-compatible semantics |
|---|---|
| argument-list | Structure and its substructures may bind values to event signal computation function parameters |
| named-argument | If argument is "speed", value will be bound to @evt1_target_speed |
| expression | Expression will be evaluated before parameter binding |
| physical-literal | Value which may be bound to a parameter |

FIG. 19B

Example: Event repo-compatible semantics

| Language structure | "relative positive event"-compatible semantics |
|---|---|
| scenario-declaration | N/A |
| parameter-declaration | Declares and named, typed variable that may be referenced later. |
| type-declarator | Declares type of a variable |
| do-directive | N/A |
| do-member | Structure and its substructures may declare a "forward movement event" |
| composite-operator | N/A |
| behavior-invocation | If behavior is drive, declares a "relative positive event", may be declared. Actor on which the behavior invocation is called bound to @evt2_target_vehicle with the parent_tag parameter set to the @evt2_event_declaration tag |
| behavior-with-declaration | Structure and its substructures may bind values to event signal computation function parameters |
| modifier-application | If identifier is "position", value will bind to @evt2_target_position. Value is determined by substructure. Else modifier is ignored |

Example: Event repo-compatible semantics

FIG. 20A

| Language structure | "Forward movement event"-compatible semantics |
|---|---|
| argument-list | Structure and its substructures may bind values to event signal computation function parameters |
| named-argument | If argument is "distance", value will be bound to @evt2_target_position parameter if applicable. If argument is "behind" or "ahead_of", value will be bound to @evt2_reference_vehicle. "behind" will multiply distance by -1 and "ahead_of" will multiply distance by 1 |
| expression | Expression will be evaluated before parameter binding |
| physical-literal | Value which may be bound to a parameter |

FIG. 20B

Example: Scenario description language semantics cont.

| Language structure | "composite event"-compatible semantics |
|---|---|
| scenario-declaration | N/A |
| parameter-declaration | Declares a named, typed variable that may be referenced later. |
| type-declarator | Declares type of a variable |
| do-directive | Declares the event, binding to @evt3_event_declaration |
| do-member | Declares a sub-event. The signal computation function of that sub-event will be bound to the @evt3_sub_event with parent tag equal to the @evt3_event_declaration tag of the parent do-directive |
| composite-operator | Binds to @evt3_is_serial, providing value "true" if identifier is "serial" and "false" if identifier is "parallel" |
| behavior-invocation | Part of a sub-event |
| behavior-with-declaration | Part of a sub-event |
| modifier-application | Part of a sub-event |

FIG. 21A

Example: Event repo-compatible semantics

| Language structure: | "Composite event"-compatible semantics |
|---|---|
| argument-list | Part of a sub-event |
| named-argument | Part of a sub-event |
| expression | Part of a sub-event |
| physical-literal | Part of a sub-event |

FIG. 21B

Example: Scenario description language semantics cont.

Example: Scenario parsing

Example: Scenario parse tree

Example: Annotated scenario parse tree

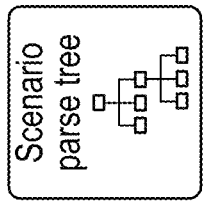
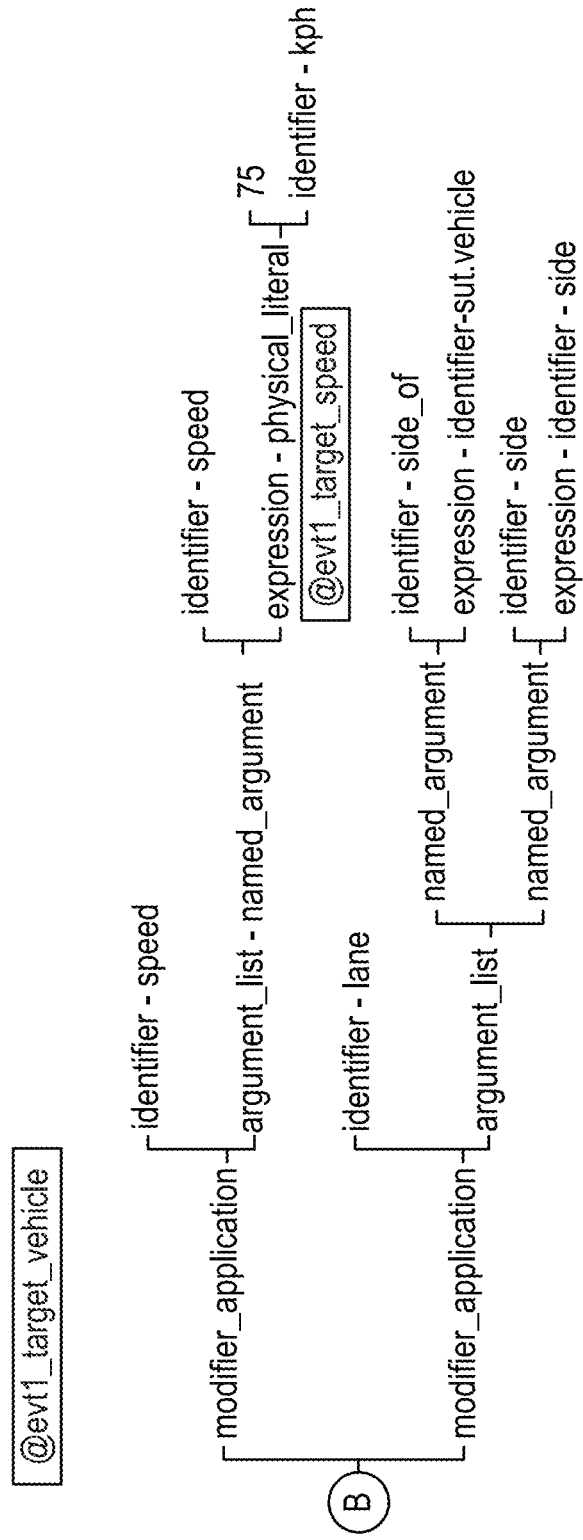
FIG. 24B

Example: Annotated scenario parse tree

Example: Event conversion & signal computation function selection

Example: Event conversion & signal computation function selection

Example: State machine creation

Example: Tokenization

Example: State machine

EDGE DATA REDUCTION IN AUTOMOTIVE SYSTEMS

PRIORITY CLAIM

This application claims priority to U.S. Provisional Patent Application No. 63/587,892, titled "Edge Data Reduction in Automotive Systems" and filed Oct. 4, 2023, which is hereby incorporated by reference in its entirety as though fully and completely set forth herein.

TECHNICAL FIELD

The present disclosure is related to systems and methods for managing data flow for assisted-driving and autonomously driven vehicles.

DESCRIPTION OF THE RELATED ART

Large amounts of data are collected for Advanced Driver Assistance Systems (ADAS) and Autonomous Vehicles (AV) to validate control systems. Collection of large amounts of data introduces computational challenges. For example, storage capacities may be limited for data collection devices (e.g. non-volatile memory on a vehicle). Data retention may quickly become costly for petabytes of data and may be infeasible to post-process and annotate. Significant portions of data may also be repetitive, low-quality, or irrelevant to a collection campaign. Improvements in data flow and data processing in the fields of ADAS and AV are therefore desirable.

SUMMARY

Embodiments described herein relate to computing systems, memory media, and methods for identifying a driving scenario from real-time driving data.

In some embodiments, a driving scenario is received that is described in a scenario description language. A plurality of events in an ordered sequence may be determined that corresponds to the driving scenario.

In some embodiments, for each event of the plurality of events, a respective signal computation function may be determined that quantifies proximity to the respective event.

In some embodiments, driving data may be received for each of a plurality of time steps. Respective values of each signal computation function may be determined, evaluated for the driving data at each of the plurality of time steps.

In some embodiments, it is determined whether the driving scenario has occurred within the plurality of time steps using the determined signal computation function values.

In some embodiments, based on the determination whether the driving scenario has occurred, a first portion of the driving data is either modified, discarded and/or stored in the non-transitory computer-readable memory medium.

Note that the techniques described herein may be implemented in and/or used with a number of different types computing systems, autonomous or assisted driving vehicles, and various other computing devices.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description of the preferred embodiments is considered in conjunction with the following drawings.

FIG. 1 is a system diagram illustrating an advanced driver assistance systems (ADAS) or autonomous vehicle, according to some embodiments;

FIG. 10 illustrates pseudocode of semantics for a first event, according to some embodiments;

FIG. 11 illustrates pseudocode of semantics for a second event, according to some embodiments;

FIG. 15 illustrates an example driving scenario in a scenario description language, according to some embodiments;

FIG. 16 illustrates example grammar for a scenario description language, according to some embodiments;

FIGS. 17A-B illustrate example semantics for a scenario description language, according to some embodiments;

FIGS. 19A-B illustrate an example of event-repo compatible semantics for a first event, according to some embodiments;

FIGS. 20A-B illustrate an example of event-repo compatible semantics for a second event, according to some embodiments;

FIGS. 21A-B illustrate an example of event-repo compatible semantics for a composite event, according to some embodiments;

FIGS. 24A-B illustrate an example annotated scenario parse tree, according to some embodiments;

Figure 2:
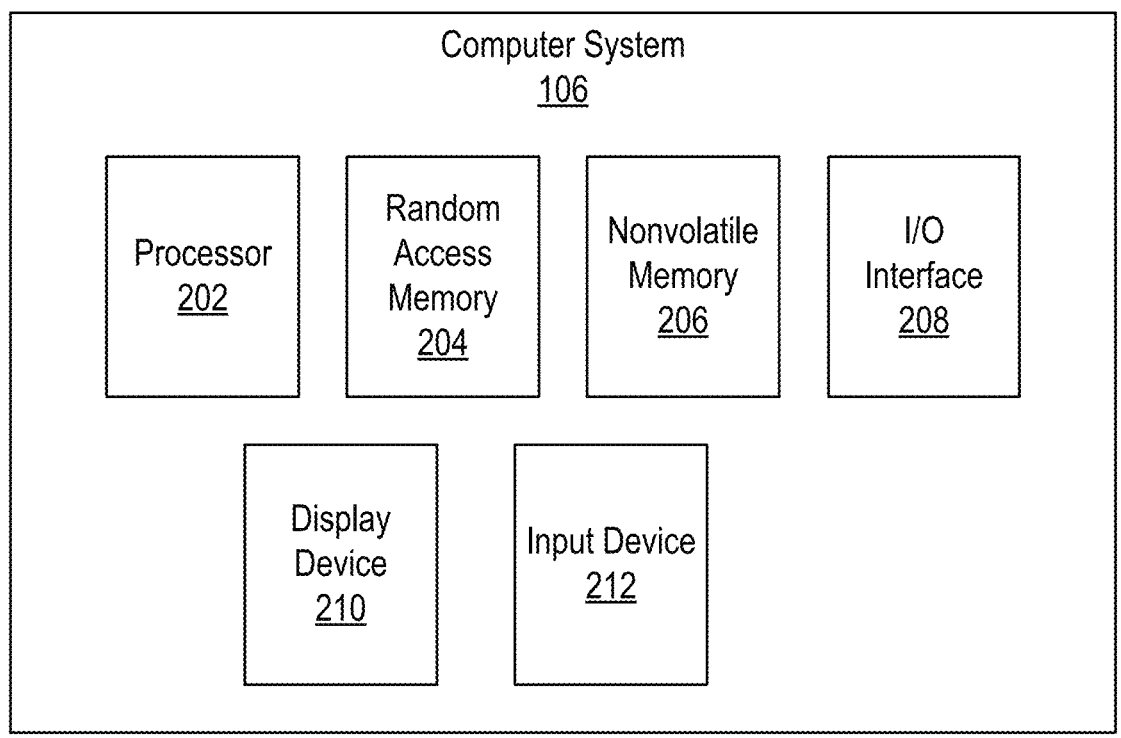
FIG. 2 illustrates an example computer system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Terminology

The following is a glossary of terms used in the present document.

Device Under Test (DUT) or Unit Under Test (UUT)—A physical device or component that is being tested.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Multiprocessor System—a computer system that includes multiple processing elements, i.e., processors, processing cores, or even networked computers, that may operate in a coordinated manner to execute program instructions concurrently.

Concurrently—a manner of performing actions or processes such that at least a portion of the (concurrent) processes overlap in time, e.g., at least one of the processes executes at least one iteration while another process executes an iteration. Concurrence, as used herein, may be accomplished in any of multiple ways, including through the use of single processor systems, e.g., via multi-threading, time-slices, etc., or multiprocessor (or multicore) systems, as well as any other technique for processing functions at the same time.

Function—a discrete set of one or more steps that form at least a part of a process.

Acquisition—refers to the acquiring of analog signals and converting the analog signals to digital data, e.g., bits.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "graphical user interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window, panel, or dialog box having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output. Exemplary graphical user interface elements include input controls and output indicators.

Input Control—a graphical user interface element for providing user input to a program. Exemplary input controls include buttons, check boxes, input text boxes, knobs, sliders, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

DETAILED DESCRIPTION

FIG. 1: Autonomous Vehicle

FIG. 1 illustrates an example of an advanced driver assistance system (ADAS) vehicle or an autonomous vehicle (AV) 102, according to some embodiments. Embodiments herein refer to the vehicle as an AV, but it is within the scope of the present disclosure to apply the described embodiments to ADAS vehicles as well. The AV shown in FIG. 1 is exemplary only, and other types and configurations of ADASs and/or AVs are also within the scope of the present disclosure. As illustrated, the AV 102 has installed thereon sensors 104a and 104b, which may be LiDAR sensors, cameras, accelerometers, or other types of sensors. The sensors may be configured to take images of the surroundings of the AV, such as the LiDAR image 108, from which positions, velocities, and/or accelerations of objects in the vicinity of the AV may be determined. FIG. 1 illustrates two sensors 104a-b for simplicity, but AVs may more generally include larger numbers and types of sensors, as desired.

The AV 102 may further include a computing system 106, such as the computer system shown in FIG. 2. The computing system may be configured to receive sensor data from the sensors and output driving instructions to autonomously drive the AV. The computing system may be configured to perform edge data reduction according to embodiments described herein. The computing system 106 is illustrated in the front of the vehicle, but more generally the computing system may be installed in any desired location within the vehicle, or alternatively the computing system may be remotely located and may communicate wireless with the AV.

FIG. 2—Computer System

FIG. 2 illustrates a computer system 106 that may include a processor 202, random access memory (RAM) 204, nonvolatile memory 206, a display device 210, an input device 212 and an I/O interface 208 for coupling to the sensors 104a-b. For example, the computer system 106 may include at least one memory medium on which one or more computer programs or software components according to one embodiment of the present invention may be stored. For example, the memory medium may store one or more programs that are executable by the processor to perform the methods described herein. The memory medium may also store operating system software, as well as other software for operation of the computer system. Various embodiments further include receiving or storing instructions and/or data implemented in accordance with the foregoing description upon a carrier medium.

As shown, the computer system 106 may include a processor that is coupled to a random access memory (RAM) and a nonvolatile memory. The computer system 106 may also comprise an input device for receiving user input and a display device for presenting output. The computer 102 may also comprise an Input/Output (I/O) interface that is coupled to the vehicle sensors and the driving controls of the AV (e.g, the gear shifter, gas pedal, brakes, steering, etc.). The I/O interface may be configured to receive sensor data from the sensors, store processed data in memory for further analysis, and/or provide driving instructions to the AV.

Edge Data Reduction for Autonomous Driving

In order to safely and effectively direct Advanced Driver Assistance Systems (ADAS) and Autonomous Vehicles (AV), a large amount of sensor data may be collected, processed, and analyzed. The large quantity of big data that is collected may strain the computational capabilities of the computing systems installed on the vehicle.

Training and deployment of ADAS and AV systems often utilize driving scenarios, which identify particular situations and sequences of events that may occur while driving that are relevant to effectively control the vehicle. These driving scenarios may be used in coordination with driving simulation software in a software development phase to train appropriate responses to the scenarios. Embodiments herein present systems, methods and software programs for performing edge data reduction in autonomous driving and assisted driving applications by identifying driving scenarios in real-time during vehicle deployment. Embodiments herein represent a driving scenario as a sequence of events, and adaptively identify the sequence of events in the continuous stream of real-time driving data, thus enabling application of a data retention policy that is associated with the sequence of events.

While driving scenarios may be used as a script for a scenario runner to follow, a scenario may also be interpreted as a sequence of events that is detectable in a continuous stream of data. By detecting scenarios in collected driving data, the collected data may be automatically reduced in real time to only retain the data that is related to the detected scenarios. For example, only collected data that is found to represent a valid instance of a driving scenario may be retained, reducing the computational burden of storing and processing the collected data. A set of scenarios may be selected for detection that correspond to different events that may occur while driving that should be responded to by the ADAS or AV system. Additionally or alternatively, driving data identified with certain driving scenarios may be selected for removal from the collected data, e.g., for scenarios such as "driving alone on a straight highway" that may not benefit from a response from the ADAS or AV system.

Some embodiments assist in bridging gaps between collection campaigns and test campaigns, where scenarios may exist before any real-world data is collected. In some embodiments, techniques are described to allow flexible and partial detection of scenarios without being directly bound to a scenario description language. In some embodiments, these techniques may be extended to automatically adapt to a variety of scenario description languages and data sources.

Figure 3:
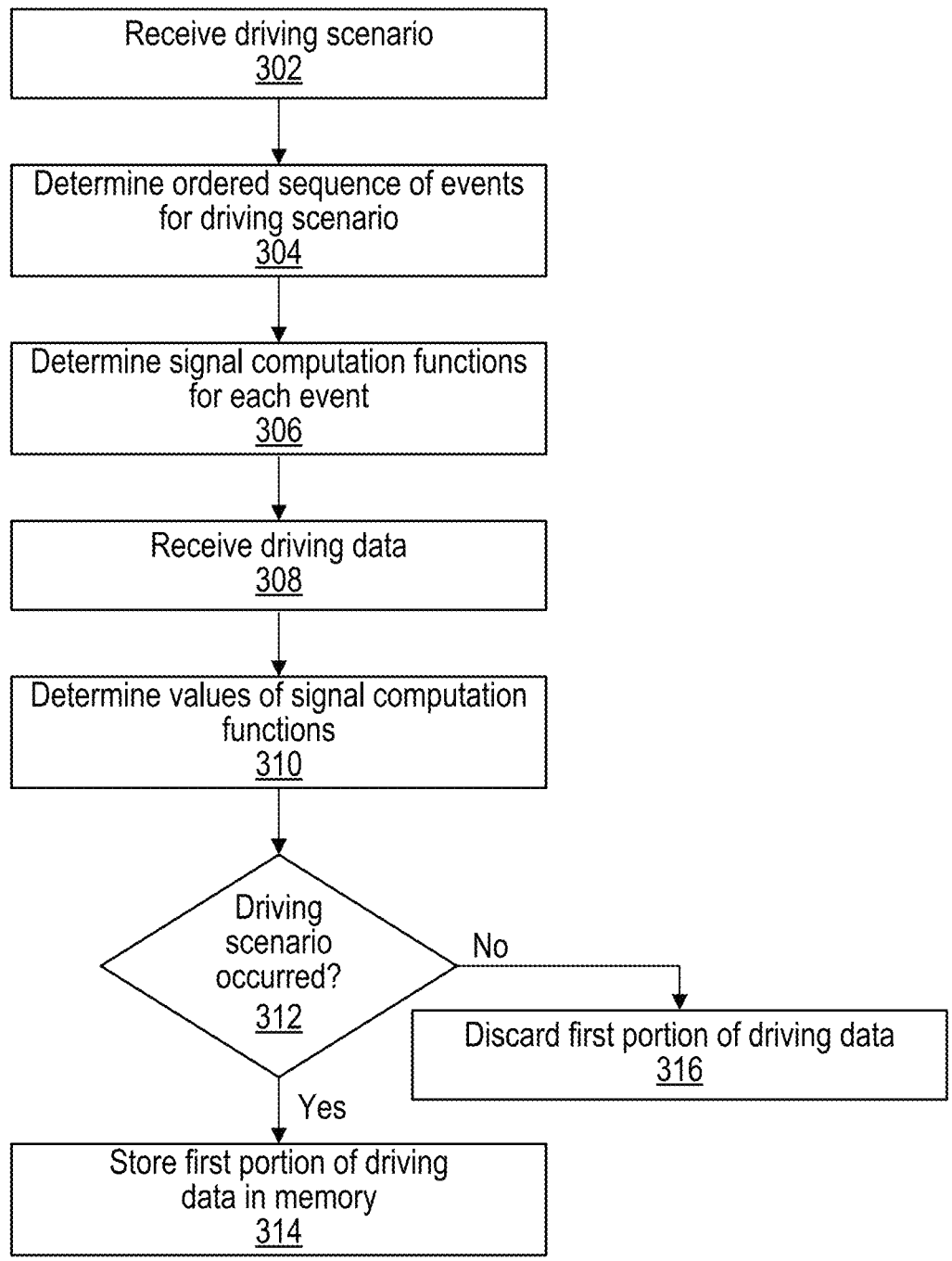
FIG. 3 is a flowchart diagram illustrating a method for determining whether a driving scenario has occurred, according to some embodiments.

FIG. 3: Flowchart of a Method for Identifying a Driving Scenario

FIG. 3 is a flowchart diagram illustrating a method for autonomously identifying a driving scenario in real time, according to some embodiments. The method shown in FIG. 3 may be used in conjunction with any of the computer systems or devices shown in the above Figures, among other devices. For example, a processor or processing element of a computer device may store program instructions in a non-transitory computer-readable memory medium that, when executed, cause the computer device to perform the recited method steps of receiving, processing, and storing information, as described below. The computer device may be installed on an AV or ADAS vehicle. In the following description, the vehicle that has sensors and the computing device installed thereon is referred to as the system-under-test (SUT) vehicle. However, it is within the scope of the described embodiments to deploy the described methods in both a simulation/testing environment as well as in a real-world driving situation.

In various embodiments, some of the method elements shown may be performed concurrently, in a different order than shown, or may be omitted. Additional method elements may also be performed as desired. As shown, this method may operate as follows.

At 302, a driving scenario is received. The driving scenario may be described in a scenario description language. The driving scenario may describe a particular occurrence that may happen while driving, e.g., the SUT vehicle takes a right turn, another vehicle pulls into an adjacent lane while the SUT vehicle is moving at a particular speed, etc.

At 304, an ordered sequence of events is determined that corresponds to the driving scenario. The events in the ordered sequence may be of various types, including but not limited to a location, velocity, and/or acceleration of the SUT vehicle; locations, velocities, and/or accelerations of one or more objects, pedestrians, or other vehicles in a detectable proximity to the SUT vehicle; a status of a traffic light; a road condition; and/or an environmental condition (e.g., fog, smoke, light levels, precipitation, etc.). The sequence of events may be ordered in time, so that they take place in a particular temporal order, and some of the events may be partially or completely concurrent. The sequence of events may describe the driving scenario in terms of events that are more elementary (and hence, easier to identify in driving data) than the driving scenario.

In some embodiments, semantic tags are extracted from the driving scenario, and events in the ordered sequence are identified using the semantic tags.

In some embodiments, determining the ordered sequence of events that corresponds to the driving scenario is performed autonomously by a machine learning algorithm, or alternatively it may be performed manually by an engineer (e.g., during a software development phase prior to vehicle deployment).

At 306, for each event in the sequence of events, a respective signal computation function is determined that quantifies proximity to the respective event. The signal computation function may be configured to receive driving data as input, and output a value from 0 to 1 that indicates proximity to the event indicated by the driving data.

In some embodiments, the signal computation functions interpolate between a value of 1 for value(s) of one or more variables (e.g., position, velocity, acceleration, and/or level of sunlight, among other possibilities) that corresponds to the respective event and a value of 0 for value(s) that differ from the respective event by more than a threshold amount. For example, if the event is "SUT vehicle moving at 40 mph", the signal computation function may equal 1 when the SUT vehicle speed is 40 mph, and may decrease to 0 for speeds that are below 37 mph and above 43 mph (in this example, the threshold difference to obtain a value of zero for the signal computation function is 3 mph. Other values and sets of relevant variables may also be used, as desired).

At 308, driving data for a plurality of time steps is received. The driving data may be received in real time as a sequence of data frames, where each data frame specifies driving information for that time step. In some embodiments, the driving data are received via one or more sensors of a vehicle. The raw sensor data may be pre-processed by a computing device prior to being received at step 308. For example, raw sensor data (e.g., LiDAR or radar image data) may be pre-processed to identify positions, velocities and/or accelerations of the SUT vehicle. objects, pedestrians and/or other vehicles represented in the raw sensor data. The raw sensor data may be pre-processed into driving data that is able to be parsed and analyzed to compute values of the signal computation functions, for example.

At 310, respective values of each signal computation function are determined, evaluated for the driving data at each of the plurality of time steps. For example, for each time step, the signal computation function for each event in the sequence of events may be computed for the driving data. Accordingly, a plot such as those shown in FIGS. 29-30 may be obtained, which illustrates the value of each signal computation function as a function of time.

In some embodiments, a binary indicator is determined for each of the values of the signal computation functions that indicates whether the respective value is greater than a predetermined threshold. This binary indicator is also referred to herein as a "token", which indicates whether the signal computation function for a particular event is close enough to 1 (i.e., within the predetermined threshold) to consider that event to be occurring.

At 312, it is determined whether the driving scenario has occurred for one or more time steps, based on the values of the signal computation functions. In some embodiments, determining whether the driving scenario has occurred is performed based on the binary indicators or tokens. In some embodiments, determining whether the driving scenario has occurred involves determining a state machine that corresponds to the ordered sequence of events. The state machine may be run using the values of the signal computation functions to determine whether the driving scenario has occurred for the examined time steps. The state machine may run continuously, occasionally flagging a subset of the time steps when the scenario is detected to have occurred.

In some embodiments, determining whether the driving scenario has occurred involves aggregating the values of the signal computation functions into composite events to obtain respective aggregate values. It may then be determined whether the driving scenario has occurred based on whether the aggregate values are greater than a predetermined threshold. An example of aggregating the signal computation functions is described in greater detail below in reference to FIG. 31.

At 314, when it is determined that the driving scenario has occurred, a portion of the driving data may be stored in the non-transitory computer-readable memory medium. In some embodiments, the stored portion is the driving data for the one or more time steps for which the driving scenario is detected to occur.

In some embodiments, the driving data is received in real time, and the portion of the data for which the driving scenario is detected is provided to an autonomous driving software program in real time for use in autonomously driving the vehicle.

At 316, when it is determined that the driving scenario has not occurred for one or more time steps, a portion of the driving data may be discarded. The discarded portion may correspond to time steps for which the driving scenario did not occur. In some embodiments, multiple driving scenarios may be detected in parallel by a plurality of respective state machines, and a portion of the driving data may be discarded only when none of the multiple driving scenarios are detected for the portion.

In some embodiments, the data may be modified based on whether the driving scenario has occurred. For example, when the driving scenario has not occurred for a portion of the data, the portion may be compressed to a lower quality file type that utilizes less storage space in memory. Alternatively, in some embodiments two thresholds may be used to determined whether a scenario has occurred, delineating three different regions. For example, thresholds of 0.6 and 0.9 may be used to delineate the three regions 0 to 0.6, 0.6 to 0.9 and 0.9 to 1 for the aggregate value of the signal computation function. In these embodiments, a portion of the data in the lowest region may be discarded, a portion in the highest region may be kept, and a portion in the middle region may be converted to a lower quality format and stored in memory. Other combinations and possibilities are also possible, in various embodiments.

Figure 4:
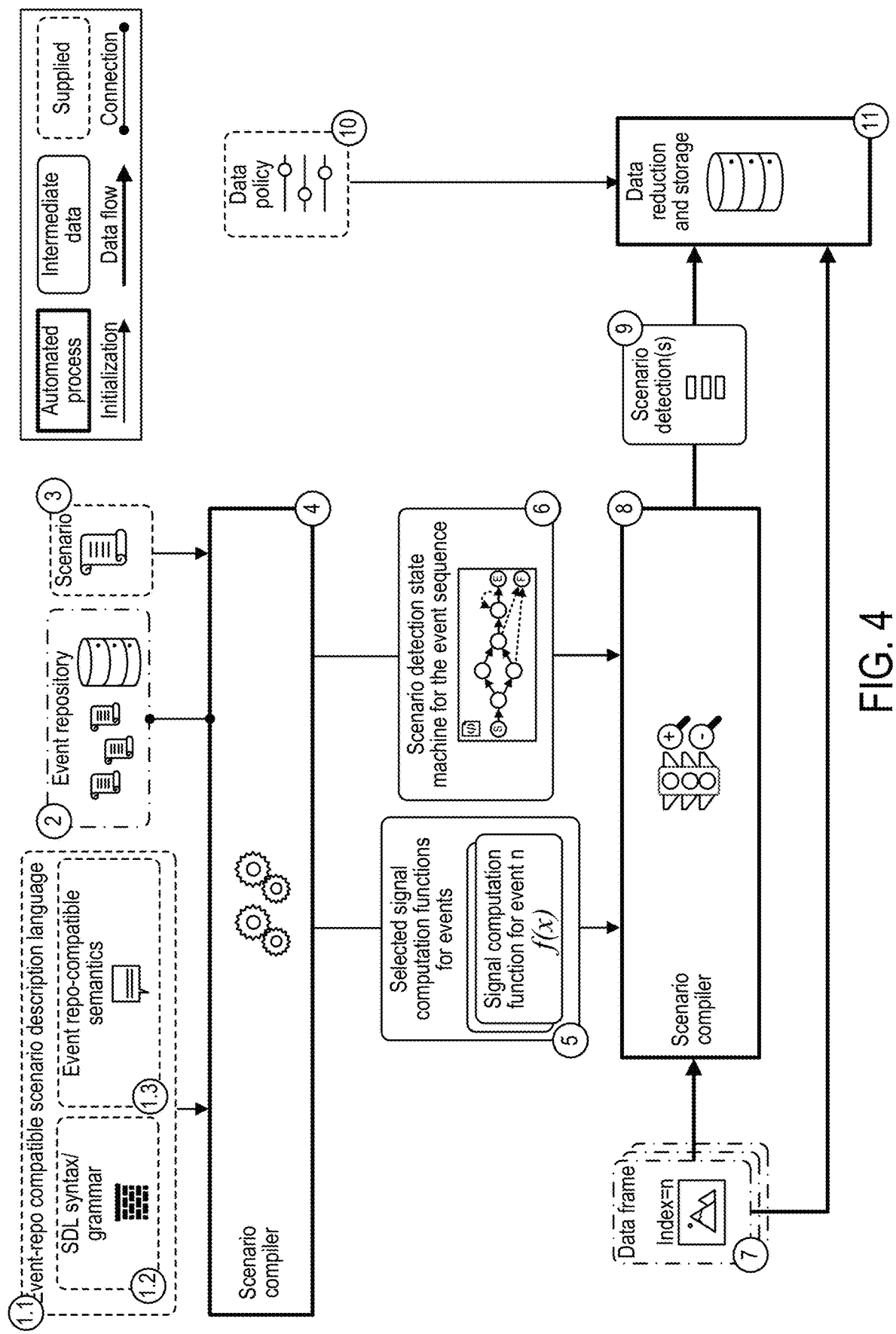
FIG. 4 is a method diagram for detecting driving scenarios, according to some embodiments.

FIG. 4—Level Flowchart for Edge Data Reduction

FIG. 4 is a flowchart diagram illustrating a method for performing edge data reduction, according to some embodiments. The method shown in FIG. 4 is similar in some aspects to the methods described in FIG. 3. The method shown in FIG. 3 may be used in conjunction with any of the computer systems or devices shown in the above Figures, among other devices. For example, a processor or processing element of a computer device may store program instructions in a non-transitory computer-readable memory medium that, when executed, cause the computer device to perform the recited method steps of receiving, processing, and storing information, as described below. The computer device may be installed on an AV or ADAS vehicle.

As illustrated a scenario compiler receives a driving scenario ("scenario"), an event repository, and an event-repo compatible scenario description language, and outputs a plurality of signal computation functions for each event of a sequence of events that are determined from the driving scenario and a scenario detection state machine for the sequence of events. These may be provided to a scenario detector, which also receives real-time driving data as a sequence of data frames describing aspects of a real driving scenario. The scenario detects whether the driving scenario has occurred in the driving data, and provides instructions to a data reduction and storage module to store, delete, and/or modify portions of the data based on whether the driving scenario was detected. The data reduction and storage module may operate based on a provided data policy, which how the presence or absence of scenario detection affects the acquisition, processing, and/or storage of the real-time driving data.

Figure 5:
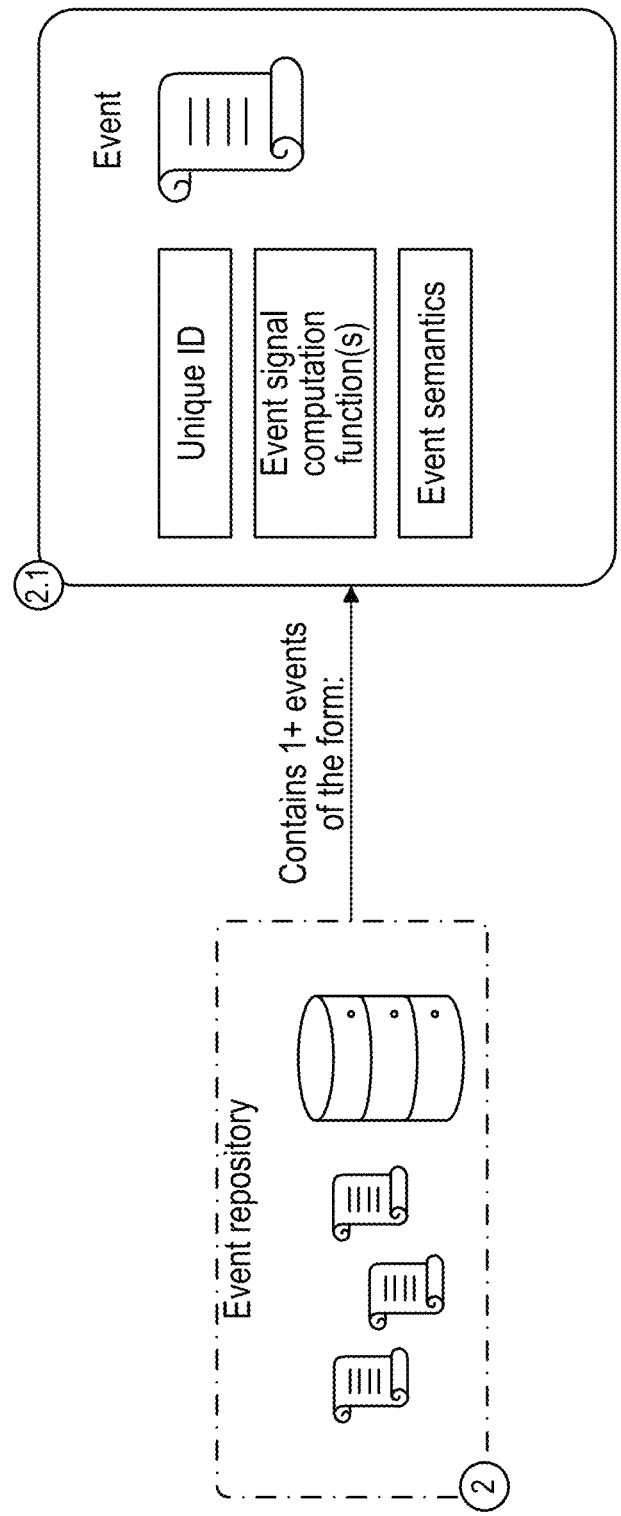
FIG. 5 is a diagram illustrating aspects of an event repository, according to some embodiments.

FIG. 5 illustrates an example structure of the event repository in greater detail. As illustrated, the event repository contains information describing one or more events, which may each include a unique identifier (ID), one or more event signal computation functions, and event semantics.

Figure 6:
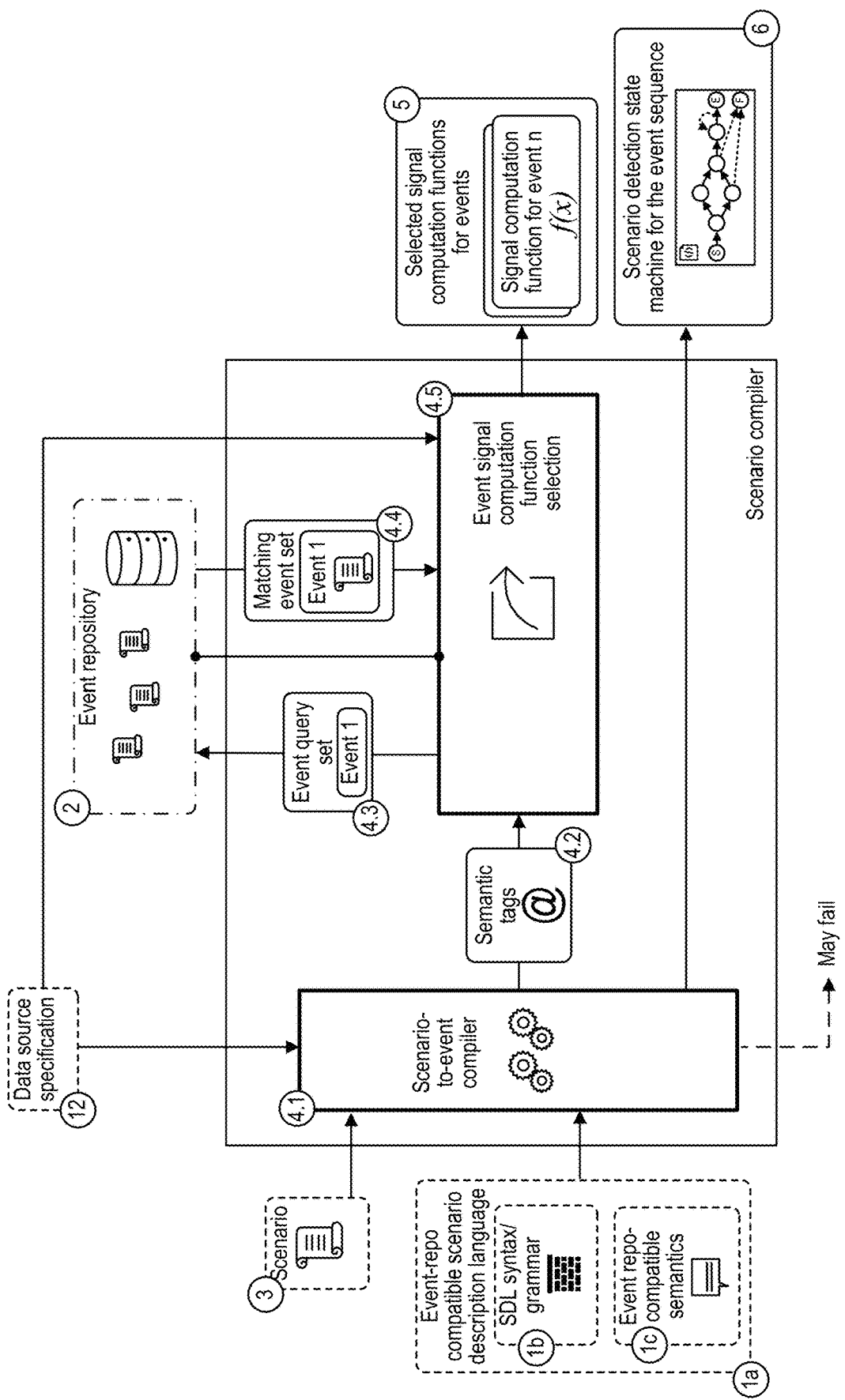
FIG. 6 is a diagram illustrating aspects of a scenario compiler, according to some embodiments.
Figure 7:
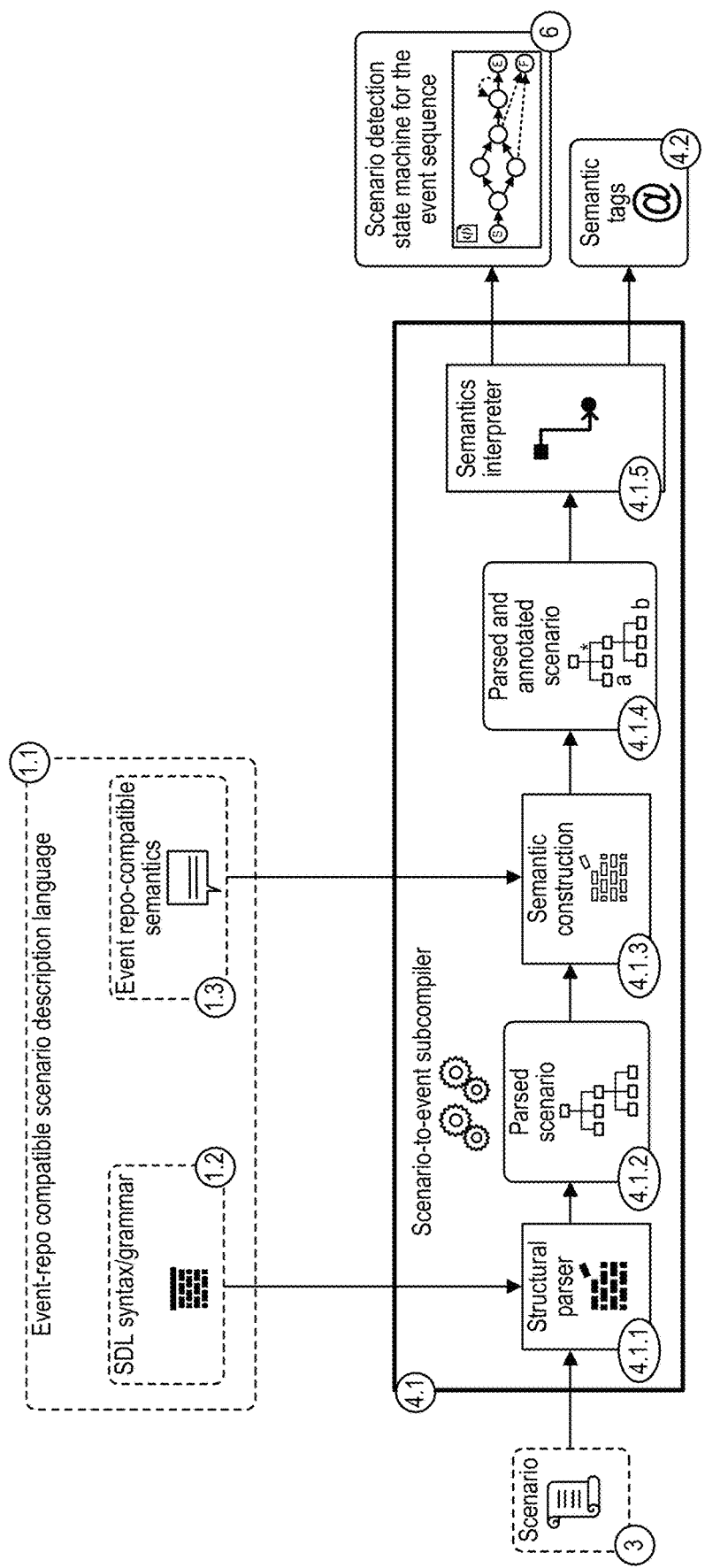
FIG. 7 is a diagram illustrating aspects of a scenario-to-event sub-compiler, according to some embodiments.

FIG. 6 is a flow diagram illustrating the scenario compiler in greater detail. A scenario-to-event sub-compiler within the scenario compiler receives a driving scenario and an event-repo compatible SDL that includes SDL syntax and/or grammar and event-repo compatible semantics. The scenario-to-event sub-compiler is described in greater detail in FIG. 7. The SDL syntax/grammar defines how to interpret the scenario, whereas the event-repo compatible semantics describe how to translate the scenario into an ordered sequence of events. As used herein, an event repo-compatible scenario description language (SDL) is an SDL equipped with semantics compatible with the inherent semantics of the events in the event repository. SDL syntax defines the language structure of an SDL and how they may compose representations of scenarios. Said another way, SDL syntax provides information related to how a scenario may be structurally parsed. SDL syntax commonly uses a formal language such as a context-free grammar to encode the language rules. Event Repo-Compatible semantics, for a subset of the language structures of an SDL, define a meaning consistent with the meanings of one or more events in the event repository. This may be expressed in multiple ways, such as by a rule-based application of semantic tags. SDL semantics define the meaning of language structures of an SDL. SDL semantics may often be encoded as natural language in a summary document for the SDL. FIG. 7 illustrates subroutines of the scenario-to-event sub-compiler.

Figure 8:
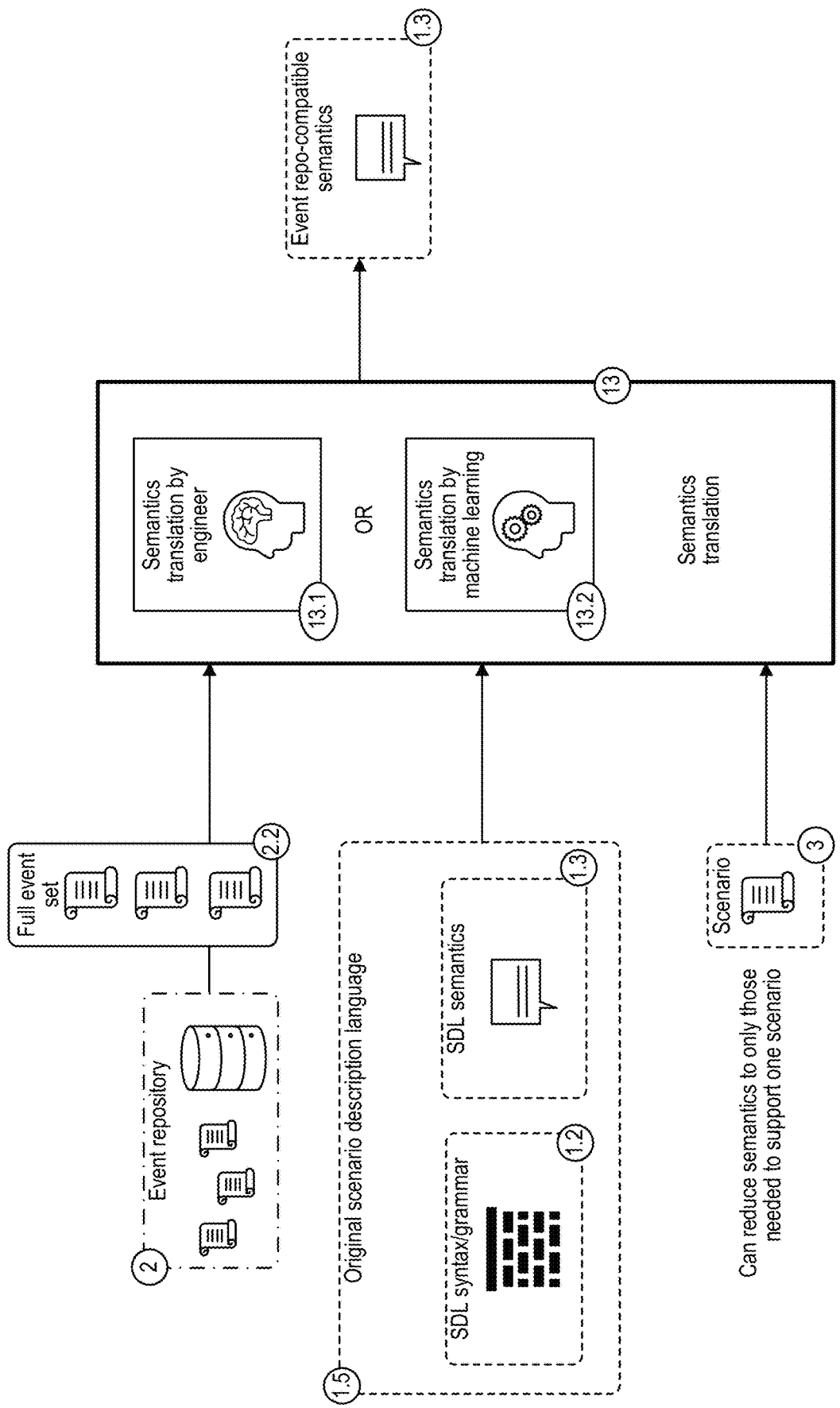
FIG. 8 is a diagram illustrating methods for translating scenario description language semantics into event-repo compatible semantics, according to some embodiments.

FIG. 8 illustrates semantics translation. As illustrated, semantics translation may either be performed manually by an engineer, or it may be automated using a machine learning algorithm.

Figure 9:
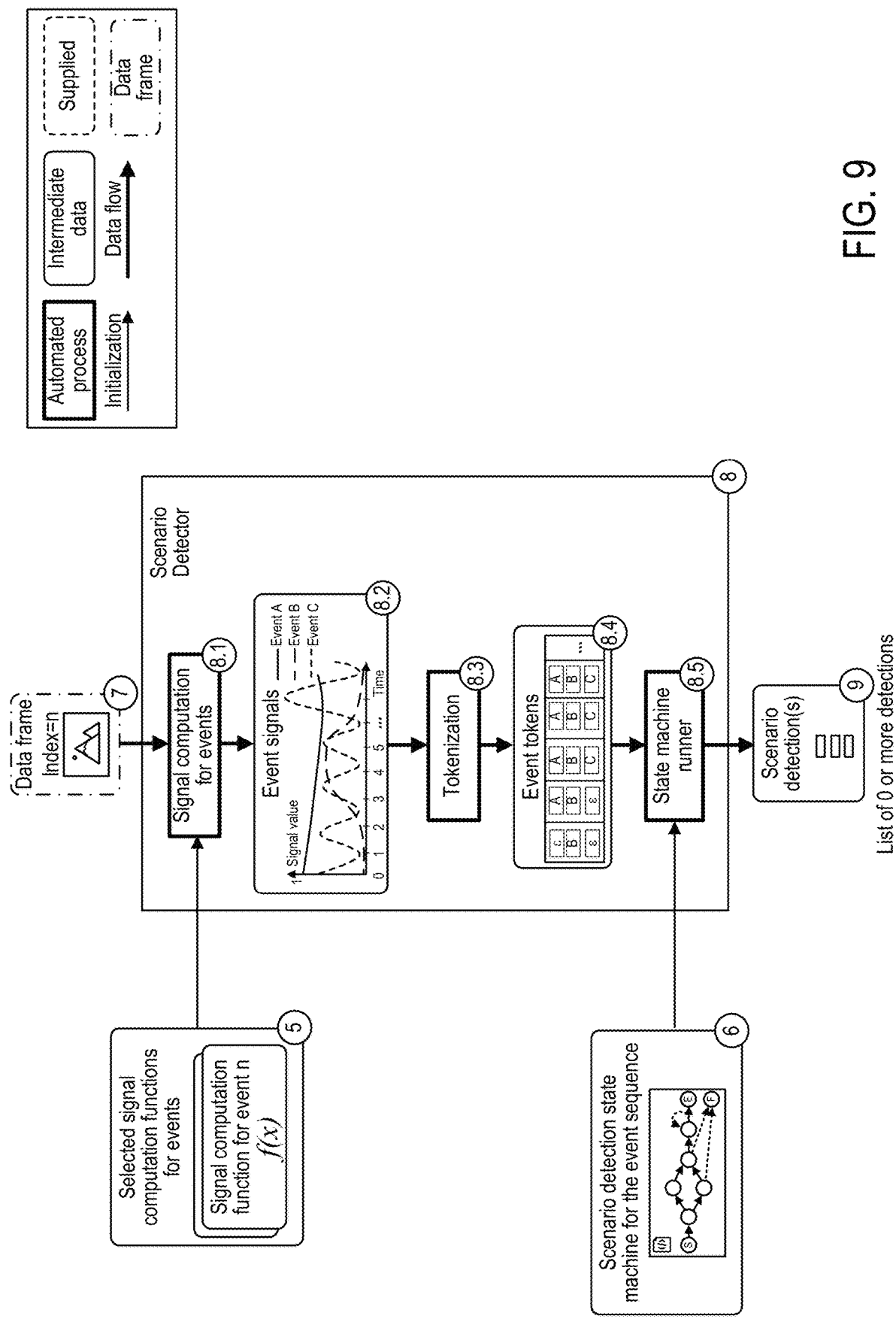
FIG. 9 is a diagram illustrating a method for performing driving scenario detection, according to some embodiments.

FIG. 9 illustrates operation of the scenario detector in greater detail.

ADDITIONAL DESCRIPTION

The following numbered paragraph provide definitions of terms used in the present disclosure.

As used herein, a Scenario Description Language (SDL) is a domain-specific language used to construct representations of scenarios. An SDL may have a particular syntax and semantics. As used herein the original SDL refers to the unaltered SDL provided to the system. As one example, the provided SDL may be ASAM's OpenSCENARIO 2.0.

As used herein, an event repository is a (potentially distributed) repository containing one or more events. An event defines a set of conditions that may be not at all, partially, or fully true at any point in time. Generally, these may be conditions about the state of the Ego vehicle, nearby traffic participants (other vehicles, pedestrians), their relation between each other (ego distance to nearest pedestrian, ego speed relative to vehicle ahead of ego), and the relation to traffic structures (ego position vs. lanes, relative lane of ego to nearest vehicle, ego speed vs. traffic light states, etc.). An event may consist of a unique ID, one or more event signal computation functions, and/or semantics.

A signal computation function is a function that yields a value between 0 and 1 to indicate proximity of currently or recently occurring driving conditions to an event. The signal computation function may also yield additional values, such as a confidence in the accuracy of the value. In some embodiments, the value may be binary, and only take on the values 0 and 1 in simple cases. Multiple signal computation functions may be defined for the same event to allow for inference about the event based on different subsets of input data. For example, an event detecting the presence of a stop sign might accept either a frame of camera data or a frame of LiDAR data. One method may be preferable to another when the appropriate data is available. The semantics of an event may define the meaning of the event, for example, what conditions about the world the event represents. The semantics may be defined in natural language and may admit structure. For example, semantics for the target speed of a vehicle may include sub-semantics of vehicle movement semantics. A "full event set" is the set of all events present in the event repository.

A scenario is a declaration of what should happen over time with and around the Ego vehicle, including parameterizations and/or potential variations. A scenario may include a description of necessary conditions to cause the scenario, and how to monitor conditions to determine whether the scenario occurred. A scenario is independent of specific sensor or driving data. The SUT vehicle is the primary actor and focus of a scenario.

Given a scenario, an event repo-compatible scenario description language, and access to an event repository, a scenario compiler, creates the initialization for a scenario detector in the form of selected signal computation functions for the events and a scenario detection state machine for the event sequence. An example of a scenario compiler is illustrated in FIG. 6.

Given a scenario and an event repo-compatible scenario description language, a scenario-to-event sub-compiler produces the scenario detection state machine for the event sequence and semantic tags. Semantic tags may include a set of (potentially parameterized) tags that indicate the presence and/or value of part (or the entirety) of an event. For example, a semantic tag may indicate that an event is present for driving backwards and that the speed of that event should be 10 kph and that it comes after a forward driving event.

An event query set is a set of queries (generally event identifiers) used to retrieve full information about events.

For each query in the event query set, a matching event may be found in the event repository, resulting in a matching event set. As used herein, event signal computation function selection is an automated process that determines the event signal computation functions to use. In some embodiments, event signal computation function selection retrieves the full events from the event repository and binds semantic tags to the parameters of the selected event signal computation functions. The events to query may be determined by the semantic tags present. For example, if a tag is present for driving backwards at a speed of 10 kph, then the query may contain at least a query for the driving backwards event. Semantic tags may be bound to parameters of the event signal computation functions. Event signal computation functions may be selected by a variety of means, such as by selecting the function with the most bound parameters or the function with the highest known accuracy, in various embodiments.

A structural parser is an automated process that uses SDL syntax and/or grammar to convert a scenario in a potentially unstructured format (e.g. a text file) to a structured format. For example, this may be an look-ahead left-right (LALR) or another left-right (LR) parser that generates a parse tree. A parsed scenario is the structural representation of a scenario, such as a parse tree.

Semantic construction is an automated process that annotates a parsed scenario with event repo-compatible semantics. E.g. semantic construction operating on a parse tree may add annotations for the types of variables present in the parse tree. A parsed and annotated scenario is a structural representation of a scenario annotated with semantic information, such as variable types and hierarchies.

A semantics interpreter is an automated process that uses the combined information of the scenario structure and semantics in the parsed and annotated scenario to generate the semantic tags. For example, it may use a depth-first traversal of an annotated parse tree to generate semantic tags with hierarchical parameterization (e.g. tag b is a child of tag a).

For each of the selected events to be used to detect a scenario, one signal computation function may be selected to compute that event's signal. The selected signal computation functions for an event may include a set of all selected functions for a scenario.

The scenario detection state machine for the event sequence refers to the (potentially non-deterministic) state machine (e.g., including, states, accepting/rejecting states, transitions) to be used by the scenario detector. The scenario detection state machine defines the logical ordering of events. Event tokens may be input to the scenario detection state machine. When an accepting state of the state machine is active, a scenario has been detected.

A data frame is a structured data object containing information about the world at a snapshot in time in the form of a collection of uniquely named values. For example, a valid data frame may be a valid JSON file. Another data frame may be constructed as a python dictionary with string keys and object values.

A scenario detector is an automated process that, given a sequence of data frames, attempts to determine if a scenario has occurred in the environment that the data frames are sampled from.

Signal computation for an event may include a runner for the relevant event signal computation functions. Functions may have parameters bound by semantic tags during the event signal computation function selection process. Unbound parameters may be provided by the input data frame. For example, a forward movement event may have the target speed of a vehicle bound by a semantic tag but the actual speed of a vehicle at a point in time may be passed in through the data frame.

Event signals are values of the event signal computation functions over time, expressed as a set of signals-one for each event.

Tokenization refers to an automated process that converts event signals into event tokens for each timestep (i.e., each data frame). This may be accomplished by a variety of analog-to-digital conversion techniques, such as by emitting an event token if its corresponding signal is greater than a threshold of 0.5, or greater than another threshold.

Event tokens are the set of tokens for each timestep (i.e., each data frame) that indicate the events that are occurring and/or have just occurred.

A state machine runner is a process running the state machine. The state machine may be deterministic or non-deterministic, and may transition to multiple states at once given the event tokens input on each step. As one example, if event tokens A and B are received at step 1, the state machine may transition into states C and D at the same time at step 2.

Scenario detection refers to the output of a scenario detector, indicating that a scenario may have occurred in the environment that the data frames are sampled from. In some embodiments, scenario detection may be expressed as a Boolean (i.e., true/false). In some embodiments, scenario detection may be expressed as a value between 0 and 1 indicating the likelihood that the scenario has occurred. Scenario detection may include additional measures such as a value between 0% and 100% to indicate the confidence that the scenario was correctly or incorrectly detected from the driving data. Scenario detection may include a starting time and an end time for the scenario.

The same scenario may be detected multiple times on the same sequence of data frames. For example, a scenario that defines a right turn may not have a precisely defined start and end condition. A valid right turn may start 1 m before an intersection and end 1 m after the intersection, or a valid right turn may also start 2 m before an intersection and end 3 m after the intersection. If both are valid, if a right turn is performed, it is possible that at least two right turn scenarios will be detected for the same turn—one for each start/end.

Because the event sequence approximates the original scenario, a scenario detection may not exactly correspond with a scenario in the original semantics.

Data policy refers to a user-provided configuration that defines how scenario detections (or lack thereof) are to be used to determine what data to keep, delete, and/or modify. In some embodiments, the data policy may decide to keep data on positive or negative scenario detection. In some embodiments, the data policy may decide to keep data on the condition of the weighted sum of scenario detections being above some threshold. In some embodiments, the data policy may decide to reduce fidelity of the data (e.g. by image down-sampling) by a factor determined by the confidence of the scenario being detected.

Data reduction and storage refers to an automated process for keeping, deleting, and/or modifying data dependent on data policy and scenario detections. Data reduction and storage may generally follow the data policy, but it may have built-in overrides, in at least some embodiments, such as always keeping data for which confidence of detection is low or when a critical scenario has been detected. A critical scenario may not be defined in the parsed input scenario but may be pre-defined in the event repository and may be added to the scenario detector.

The data source specification defines the format of the original data source. This may be used to inform the event signal function selection process. For example, if one function utilizes LiDAR data and no LiDAR data is present but radar data is, an alternative function that depends on radar may be selected. This may also be used to intelligently create a transformation from an original data stream into a scenario detector-compatible stream of data frames.

Semantics translation refers to a translation of the original semantics of an SDL to event repo-compatible semantics. Semantics translation may be performed by an expert and/or by an automated process such as a large language model. A subset of the language structures may be associated with new semantics compatible with the events in the event repository. Not all language structures may have associated semantics.

Specific Example of Scenario Detection

FIGS. 10-33 illustrate pseudocode and data related to a specific example of scenario detection, in accordance with some embodiments. FIG. 10 illustrates pseudocode for a first event, "Forward Movement Event", that may be present in the event repository. Event semantics are defined for the event, as well as a signal computation function for the event. In this example, the event semantics define movement of a vehicle at some speed (or speed range) longitudinally along a road (obeying standard laws of traffic flow) at some moment in time.

Similar data is shown in FIG. 11 for a second event, "Relative Position Event", which may also be stored in the event repository. For this example, the event semantics define a moment in time at which two vehicles are some distance apart in some direction.

Figure 12:
FIG. 12 illustrates pseudocode of semantics for a composite event, according to some embodiments.

FIG. 12 illustrates pseudocode for a composite event which is a composite of multiple events (e.g., the two events shown in FIGS. 10 and 11). In this example, the event semantics define a combination of events happening concurrently at one or more moments in time.

Figure 13:
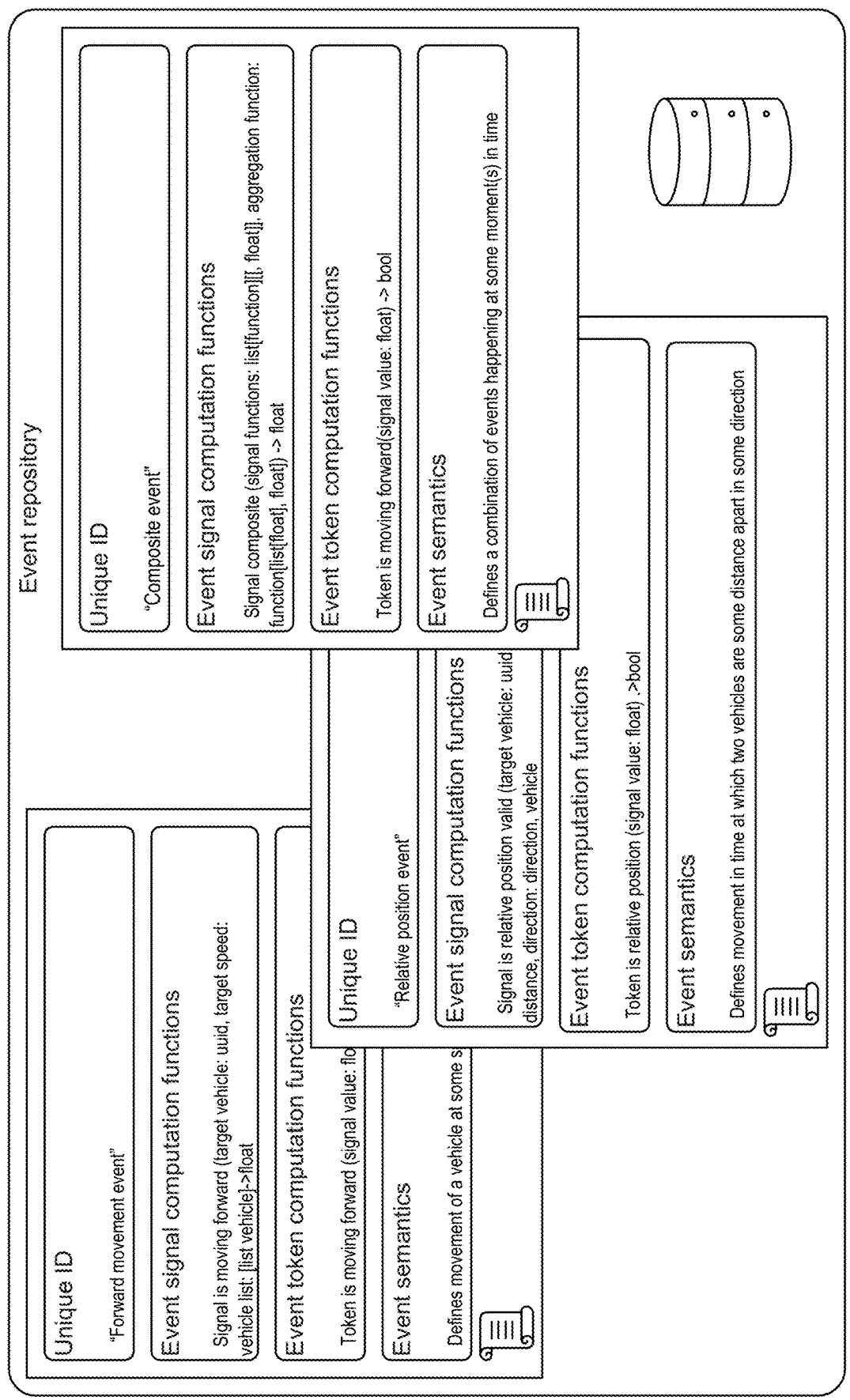
FIG. 13 is a schematic diagram illustrating event semantics within an event repository, according to some embodiments.
Figure 14:
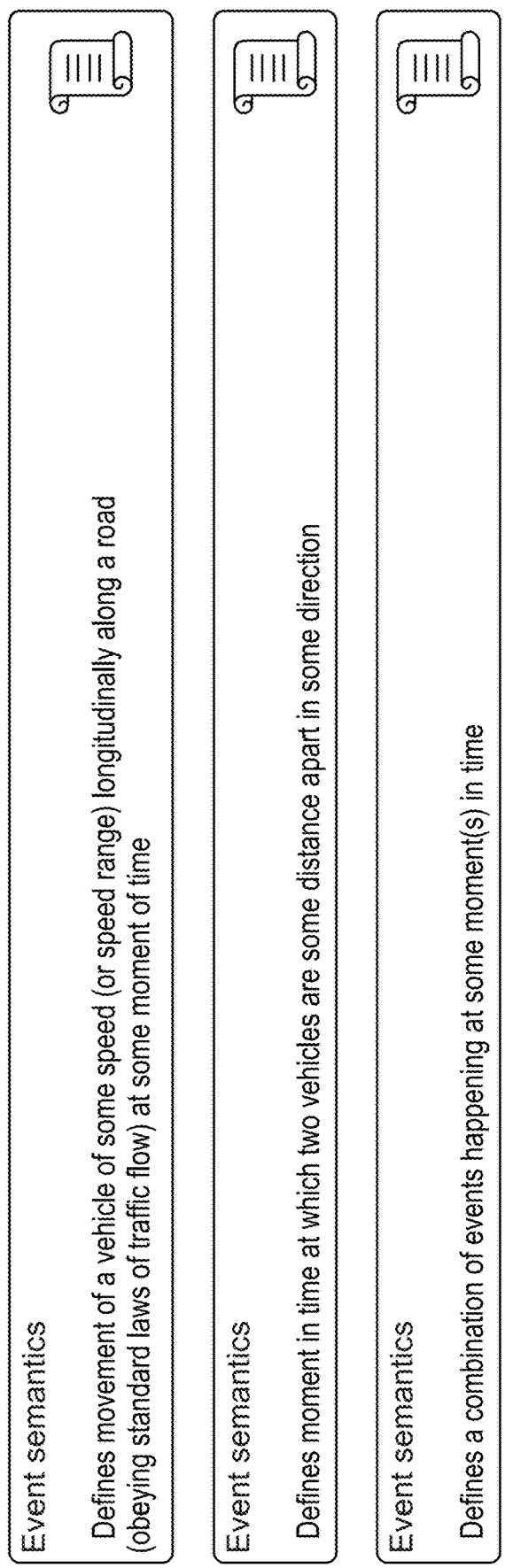
FIG. 14 illustrates event semantics for different events, according to some embodiments.

FIG. 13 schematically illustrates the three events shown in FIGS. 10-12 stored in an event repository. FIG. 14 illustrates event semantics for different events, according to some embodiments.

Figure 18:
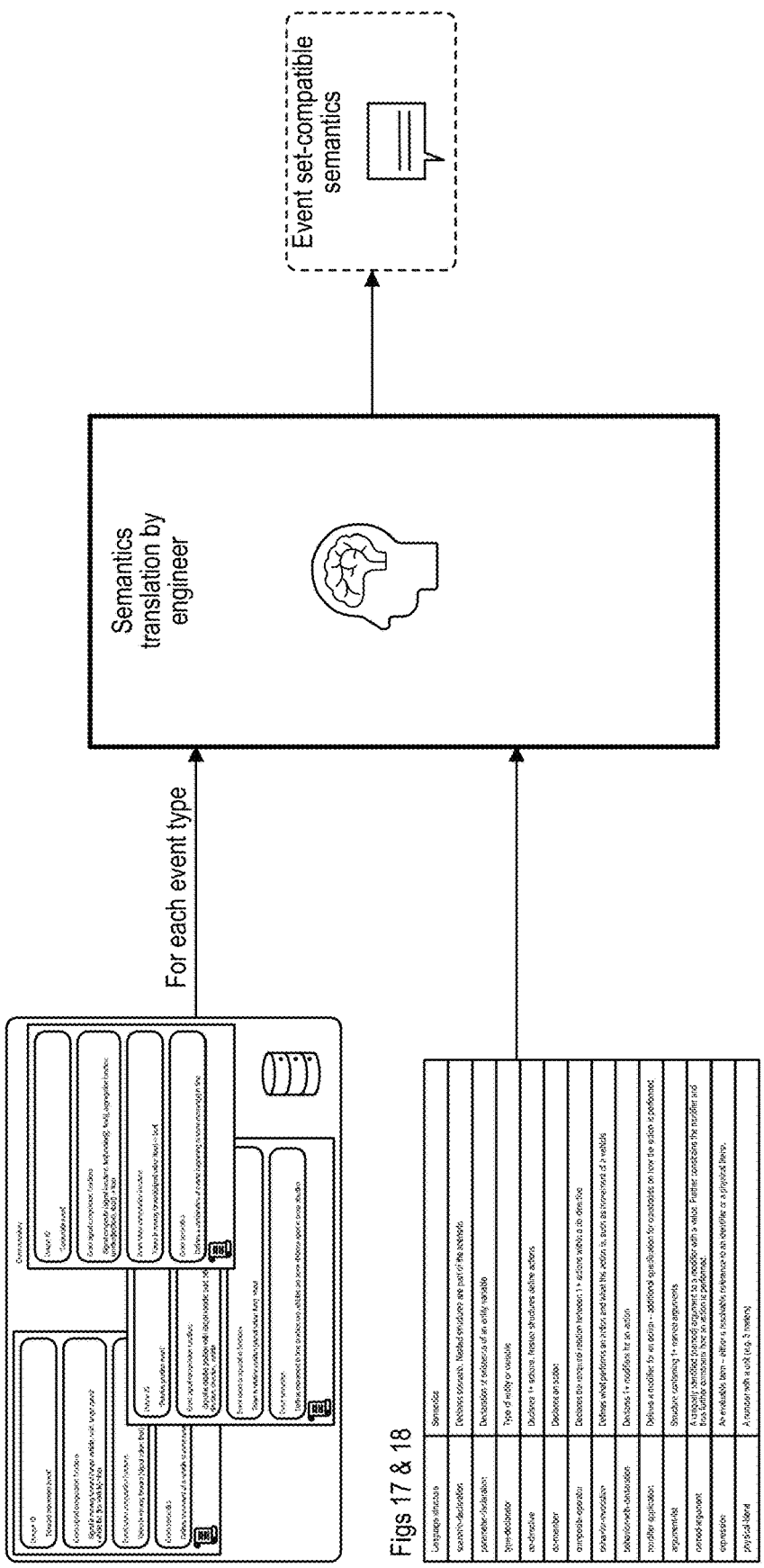
FIG. 18 illustrates a method for semantics translation, according to some embodiments.

FIG. 15 illustrates pseudocode for a driving scenario defined in an SDL. FIG. 16 shows pseudocode illustrating the SDL grammar used for the driving scenario shown in FIG. 15. FIGS. 17A-B illustrate the SDL semantics of the driving scenario shown in FIG. 15. FIG. 18 illustrates a method for semantics translation, according to some embodiments.

FIGS. 19A-B illustrate event repo-compatible semantics for the "Forward Movement Event", which translates the SDL semantics into semantics that are compatible with the event. Said another way, FIGS. 19A-B illustrate how to translate semantics of a driving scenario to the semantics of an event in the event repository. FIGS. 20A-B illustrate event repo-compatible semantics for the second event, "Relative Position Event", and FIGS. 21A-B illustrate event repo-compatible semantics for the composite event.

Figure 22:
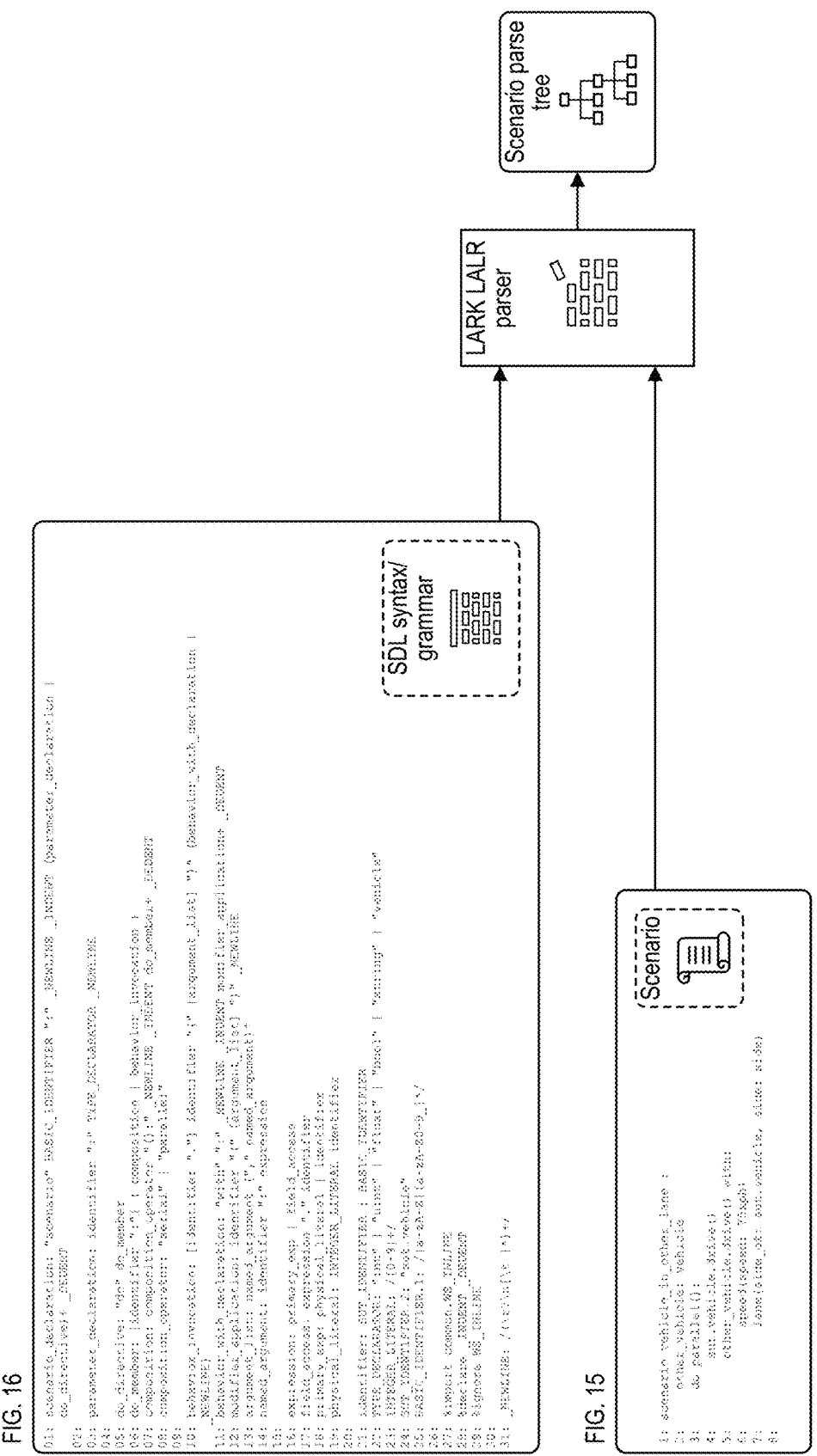
FIG. 22 illustrates an example method for constructing a scenario parse tree, according to some embodiments.
Figure 23A:
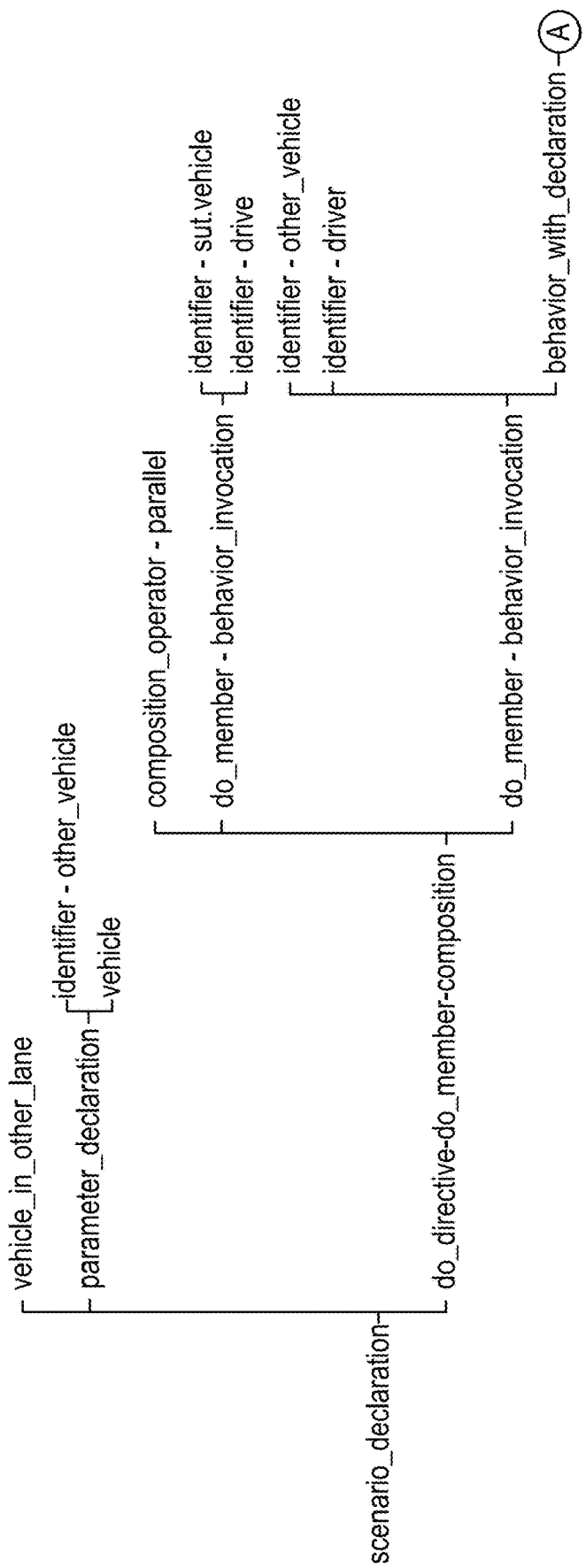
FIGS. 23A-B illustrate an example scenario parse tree, according to some embodiments.
Figure 23B:
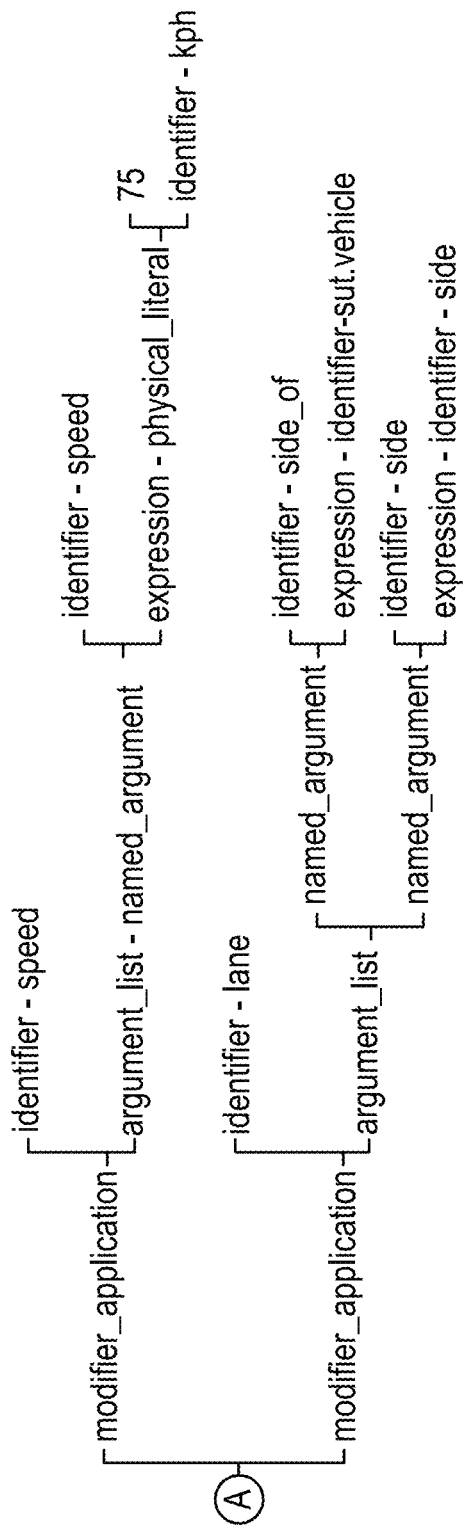
Figure 24A:
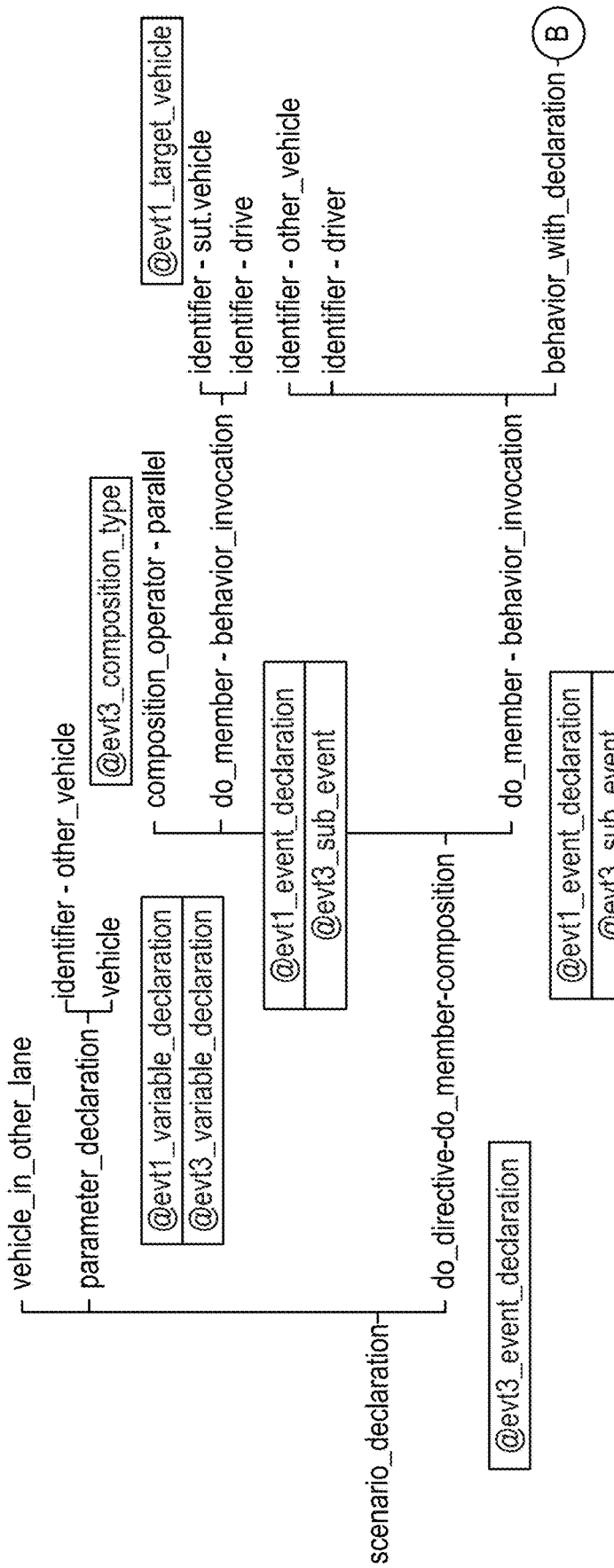
Figure 25A:
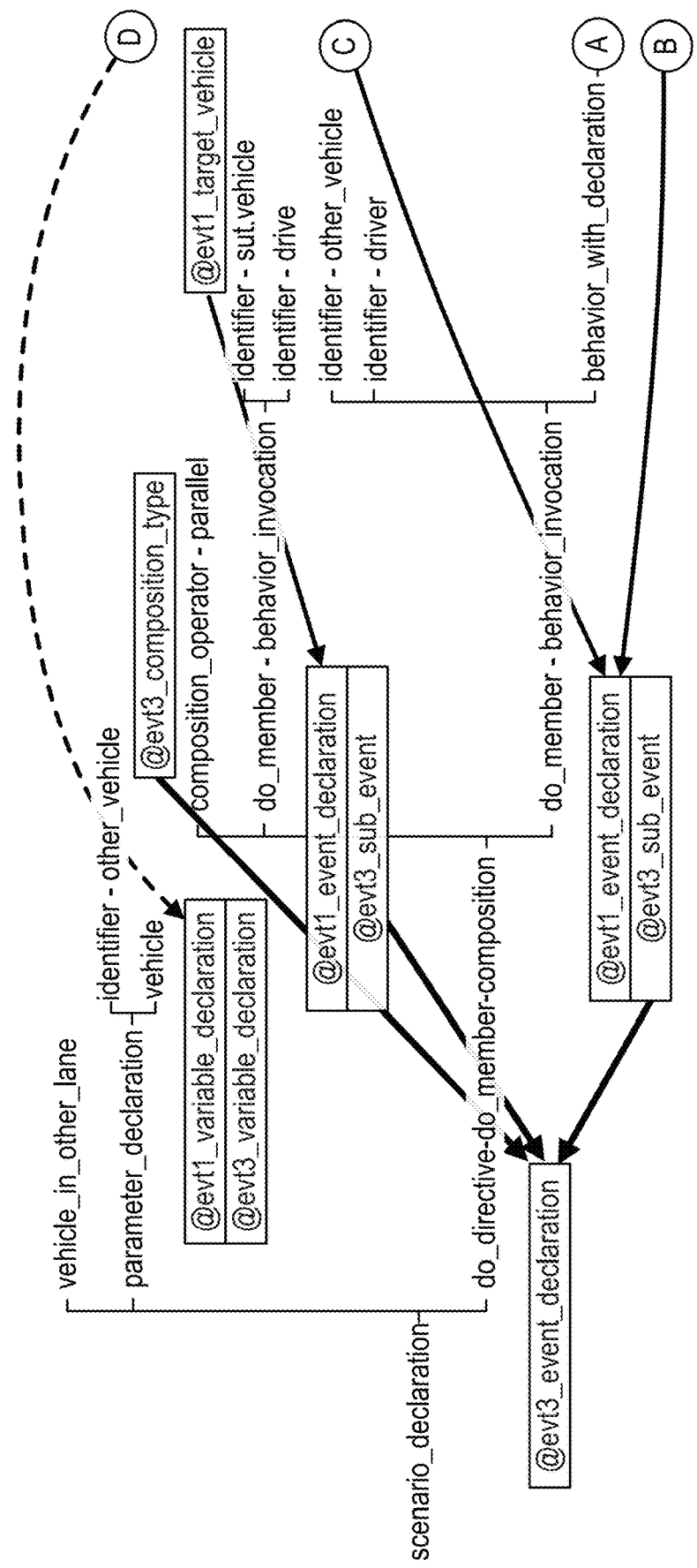
FIGS. 25A-B illustrate example semantic mappings for the annotated scenario parse tree, according to some embodiments.
Figure 25B:
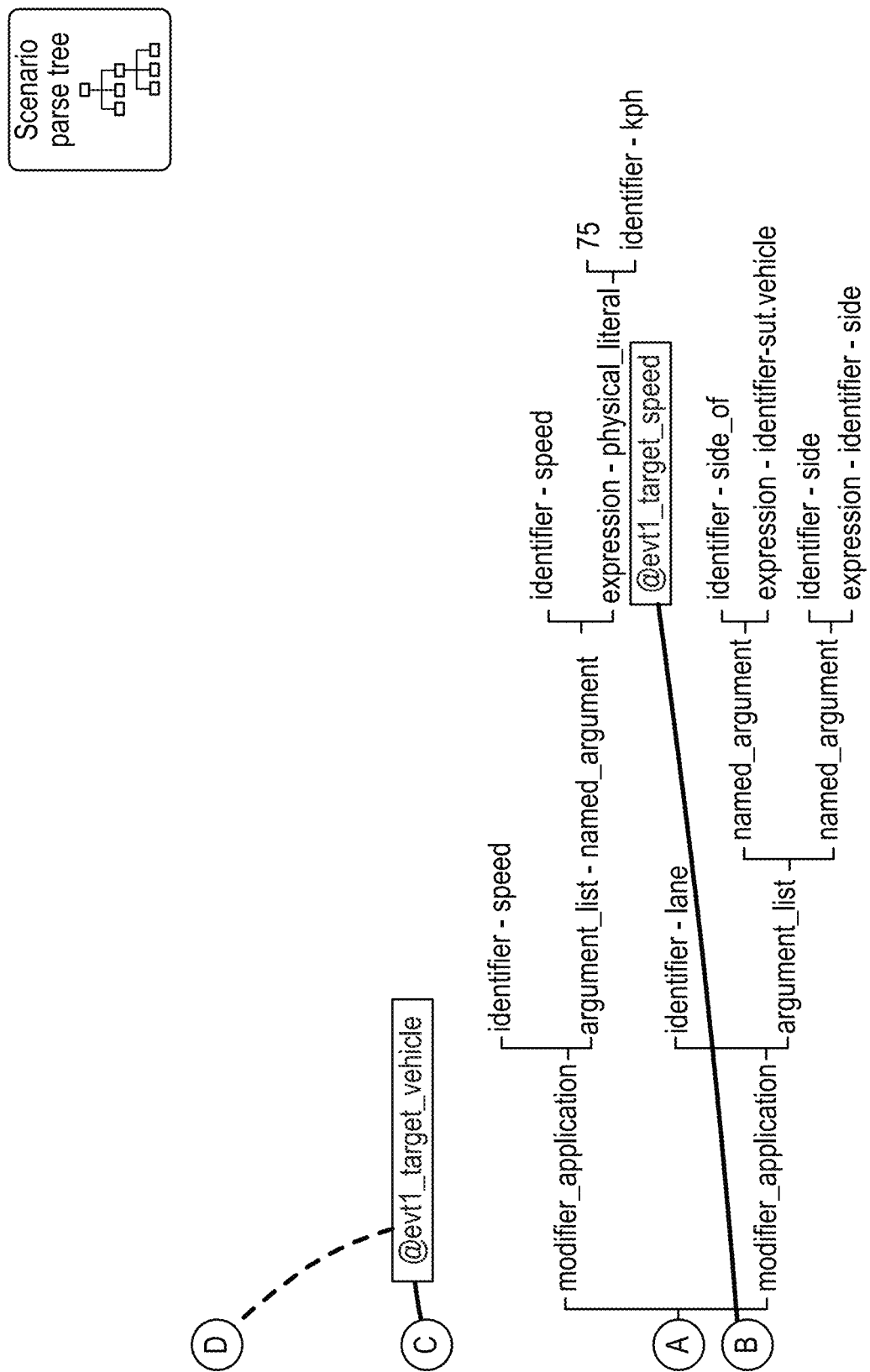

FIG. 22 illustrates pseudocode that may be used for scenario parsing to construct a scenario parse tree. As illustrated, the scenario description and the SDL syntax/grammar are provided to a LARK or a look-ahead left-right (LALR) parser, which parses the scenario into a scenario parse tree. The scenario is broken down into smaller events in the scenario parse tree, which may be simpler to identify in real-time driving data. An example of a scenario parse tree for the example scenario is shown in FIGS. 23A-B. The scenario parse tree is annotated in FIG. 24A-B with semantics of the first and second events, and semantic mappings for the annotated scenario parse tree are shown in FIGS. 25A-B. The arrows illustrate how the event semantics relate to each other. This hierarchical relationship between event semantics is shown in a more organized format in FIG. 26. In the illustrated example, tags may be bound to parameters in any signal computation function. Selection of the relevant signal computation functions may be simply performed because there is only one signal computation function provided for each event type.

Figure 26:
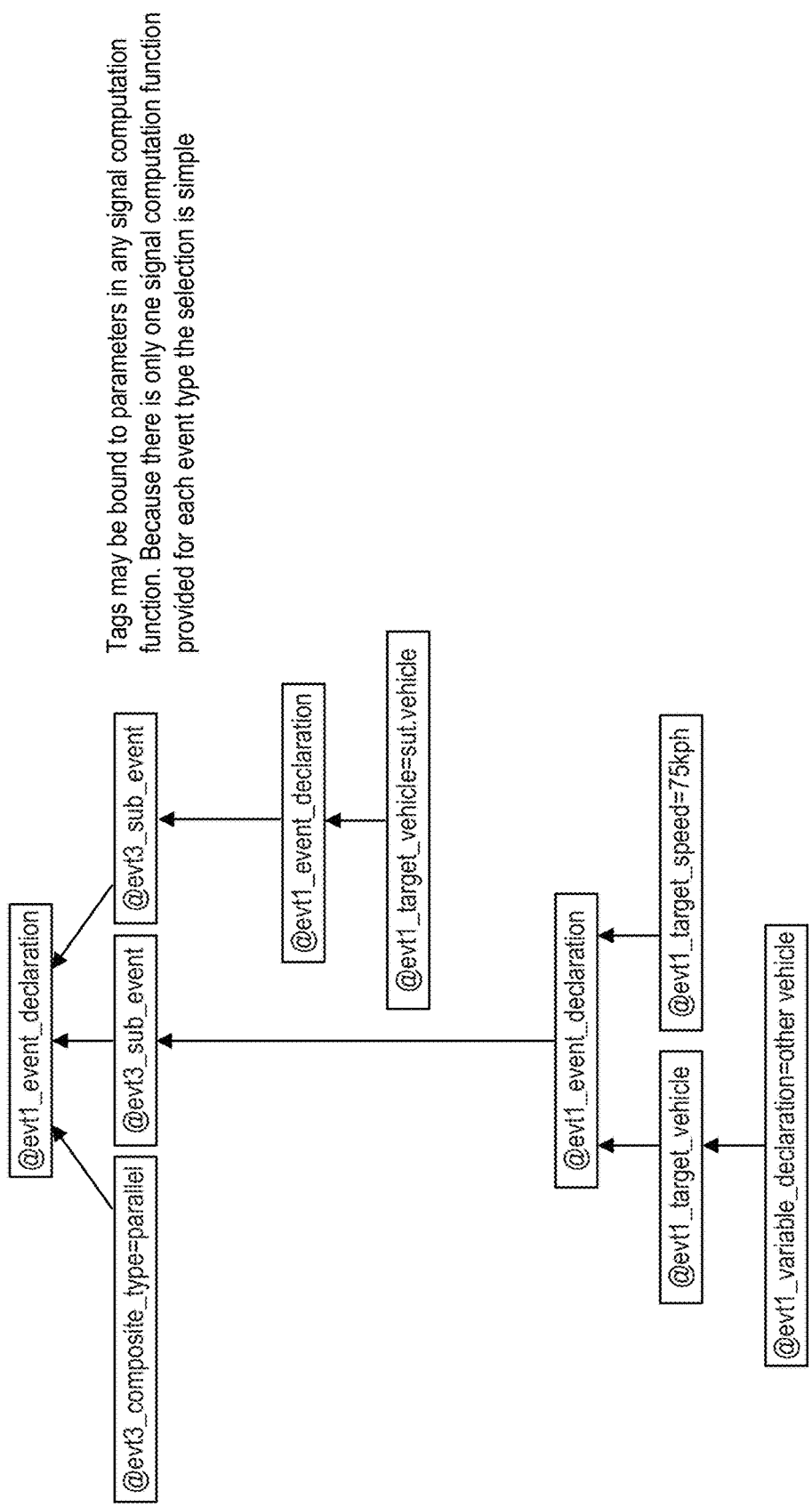
FIG. 26 illustrate an example event semantic mapping, according to some embodiments.
Figure 27:
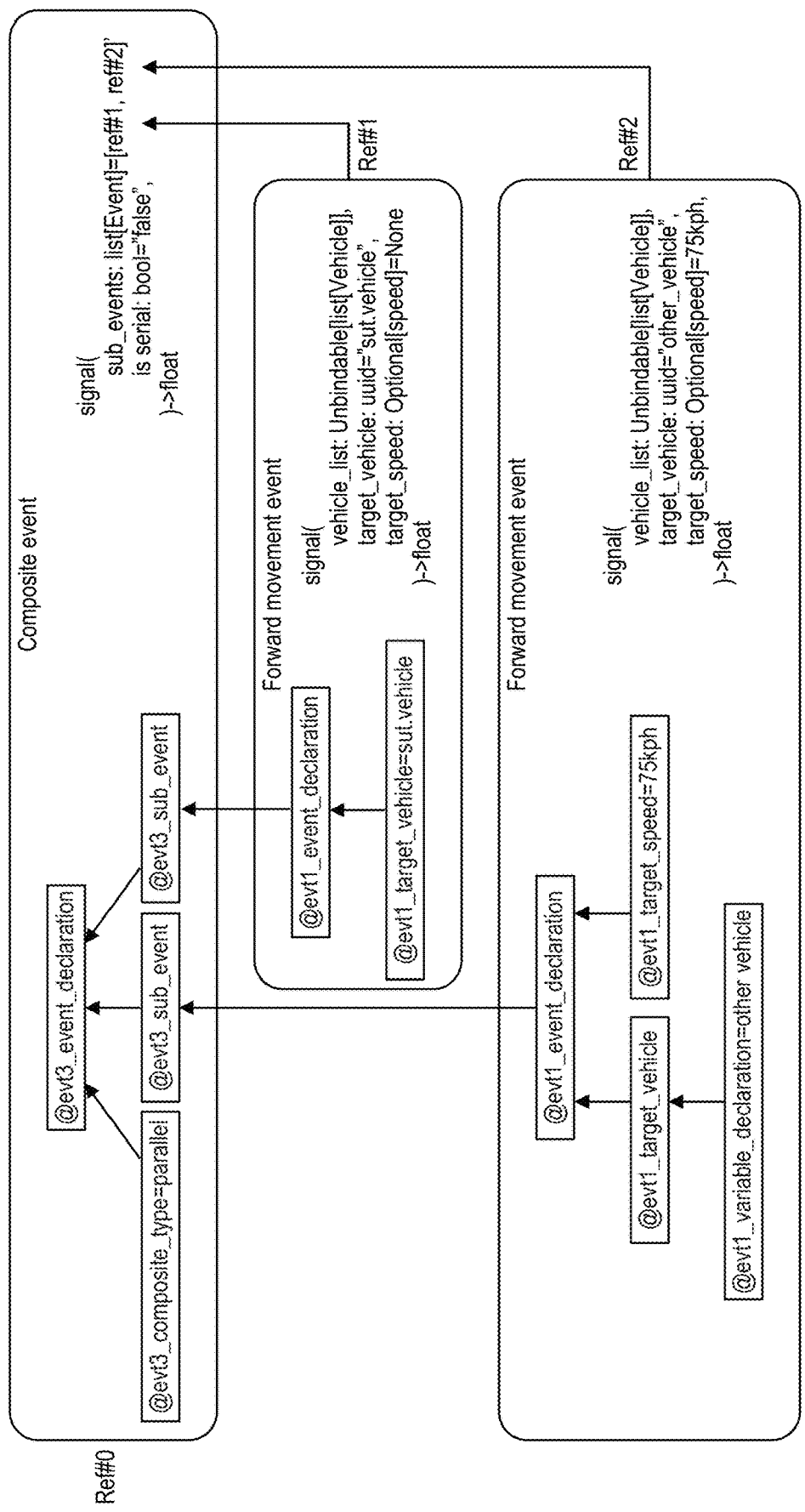
FIG. 27 separates the example event semantic mapping of FIG. 26 into separate events, according to some embodiments.

FIG. 27 separates the example event semantic mapping of FIG. 26 into separate events, according to some embodiments. FIG. 27 further illustrates how semantic tags (labelled as Ref #1 and Ref #2) may be utilized in event conversion & signal computation function selection. The semantic tags may be bound to the parameters of the event signal computation functions. The values for unbound parameters with no default values may be obtained from the driving data, which may include a collection of key-value pairs for a variety of data types. If the values are not provided in the data frame, the scenario detection process may fail. In some embodiments, the system may detect unbound parameters and report them to the user in the form of a data frame specification-a schema expressing the expected key.

Figure 28:
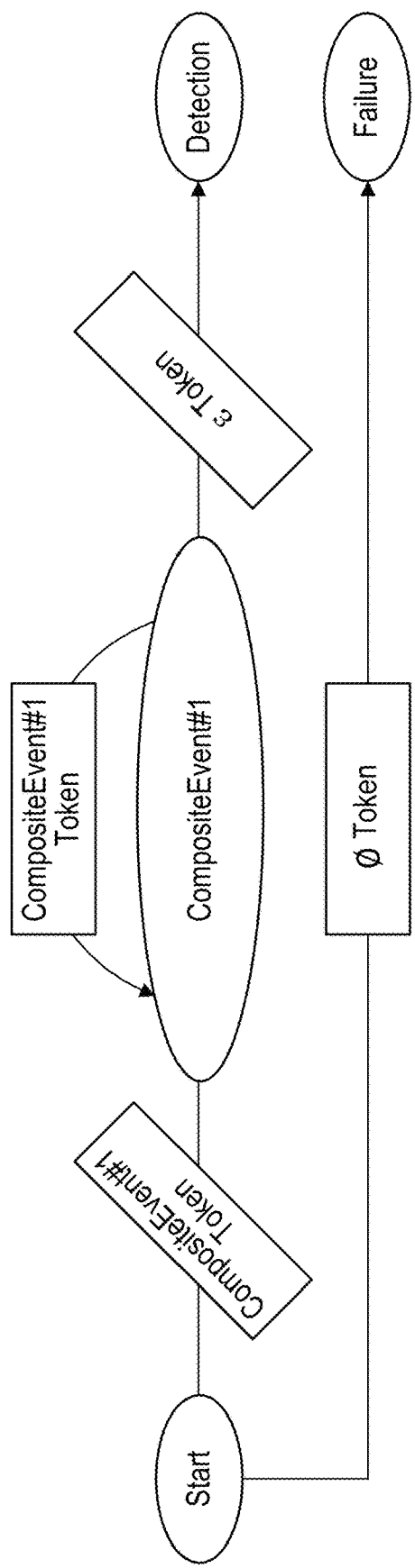
FIG. 28 illustrates an example state machine, according to some embodiments.

FIG. 28 illustrates an example of a state machine to detect the scenario shown in FIG. 15. In this example, the composite event is the only top-level event, which is therefore represented in the state machine. At each time step, the state machine will receive a token indicating whether the composite event is present for that time step, based on the value (and potentially an integrated value) of the respective signal computation function.

Figure 29:
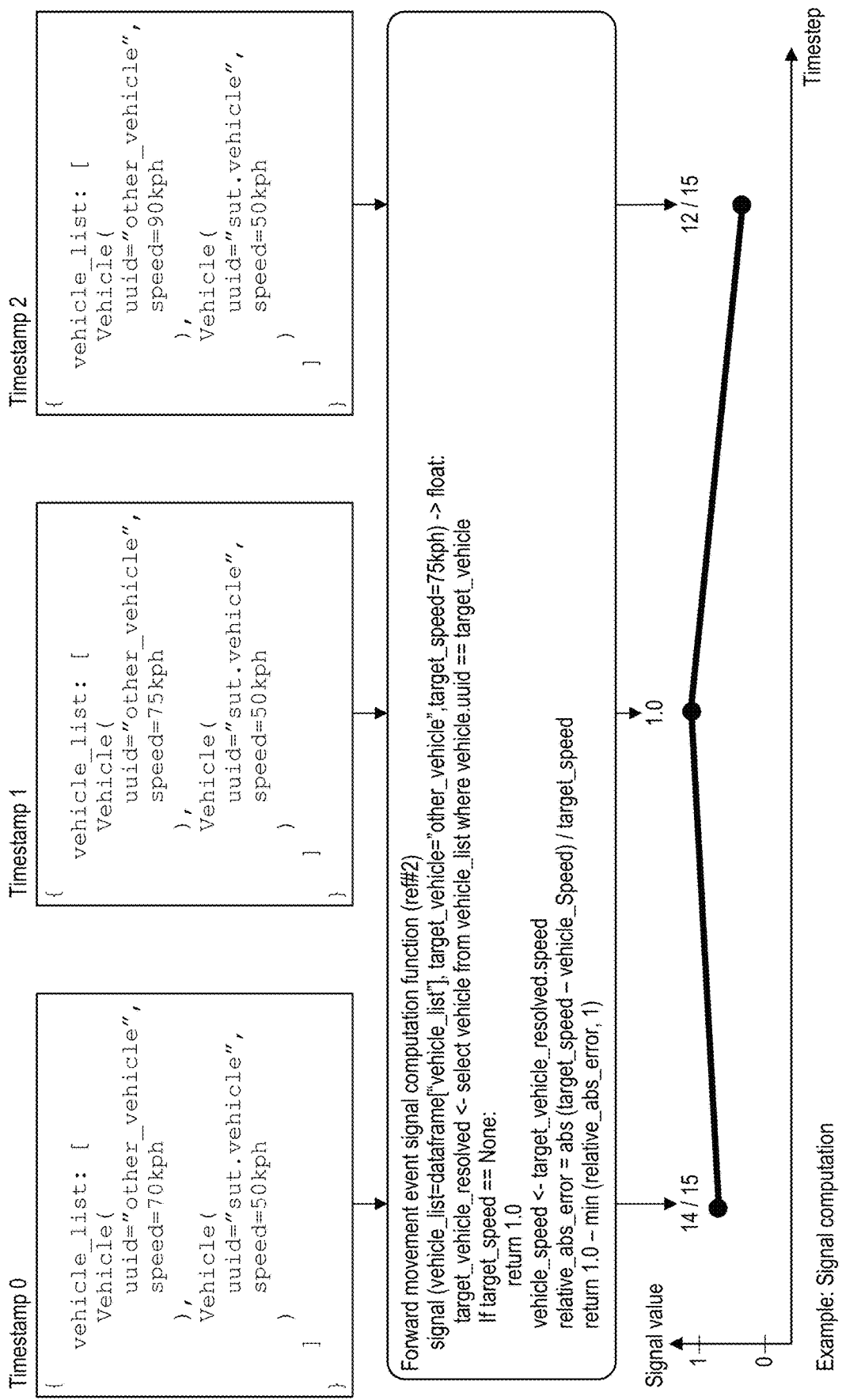
FIG. 29 illustrates determination of values for an example signal computation function for a first event, according to some embodiments.

FIG. 29 illustrates how signal values are computed at each time step for the first forward movement event that is part of the composite event. At each time step, the driving data for that time step is provided to each signal computation function and each function is run. The illustrated signal computation function is configured to output a value of 1 when the "other vehicle" is moving at a speed of 75 kph, and this value decreases linearly to 0 for speeds that differ from 75 kph. More specifically, the signal computation function returns a value of 1−min(relative_abs_error, 1), where relative_abs_error=abs(target_speed−vehicle_Speed)/target_speed, target_speed is 75 kph, and vehicle_Speed is the currently measured speed of the vehicle.

As illustrated, at time step 0 the other vehicle has a speed of 70 kph, resulting in a value of 1−(75−70)/75=14/15 for the signal computation function. At time step 1, the other vehicle has a speed of 75 kph, resulting in a value of 1. At time step 3, the other vehicle has a speed of 90 kph, resulting in a value of 12/15.

Figure 30:
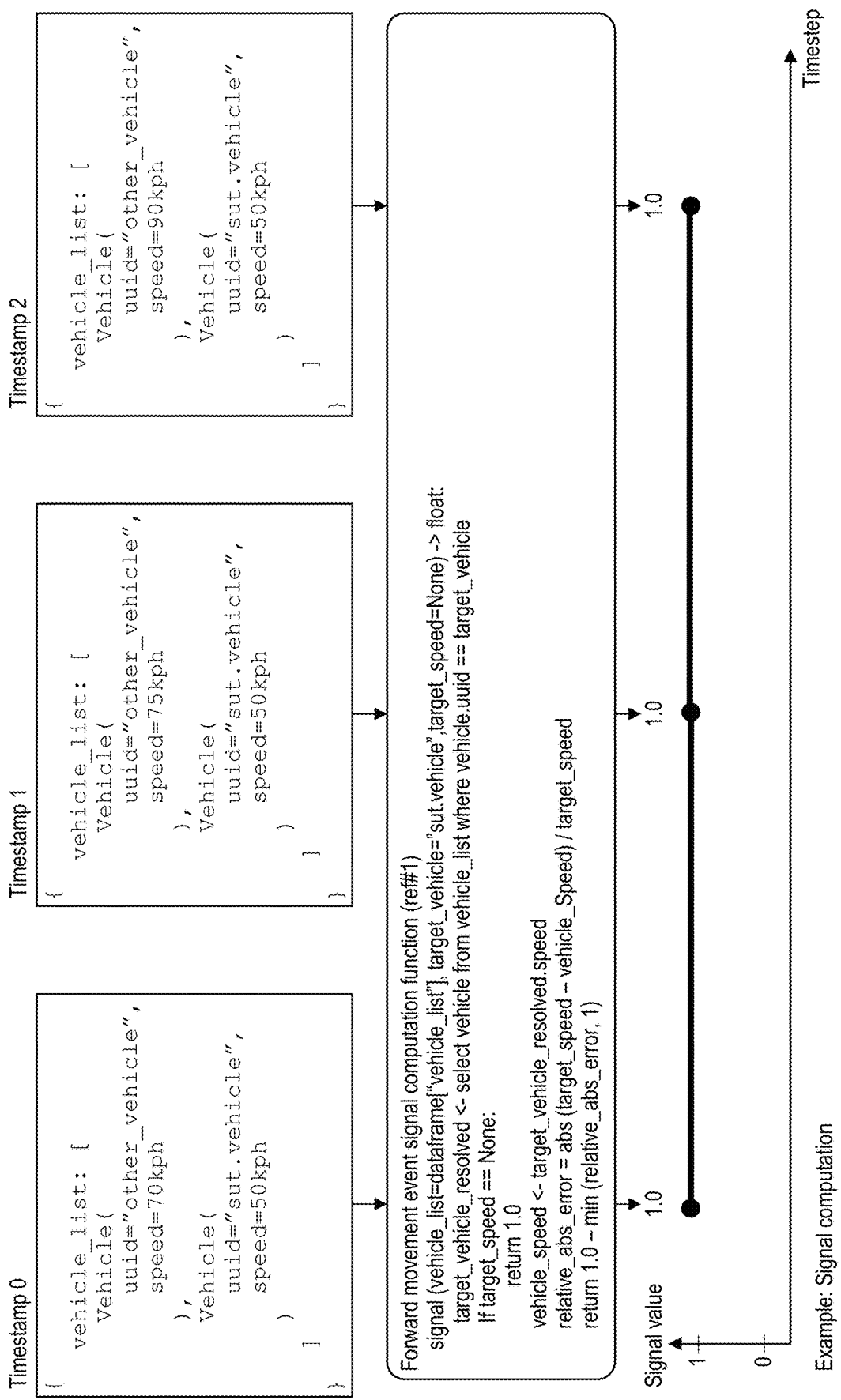
FIG. 30 illustrates determination of values for an example signal computation function for a second event, according to some embodiments.

FIG. 30 illustrates a similar example of how signal value are computed for the second forward movement event that is part of the composite event. For this case, the signal computation function determines how close the SUT vehicle speed is to the target speed of 50 kph. Because the SUT vehicle speed is 50 kph for each of the first three time steps, the value of the signal computation function is 1 for the first three time steps.

Figure 31:
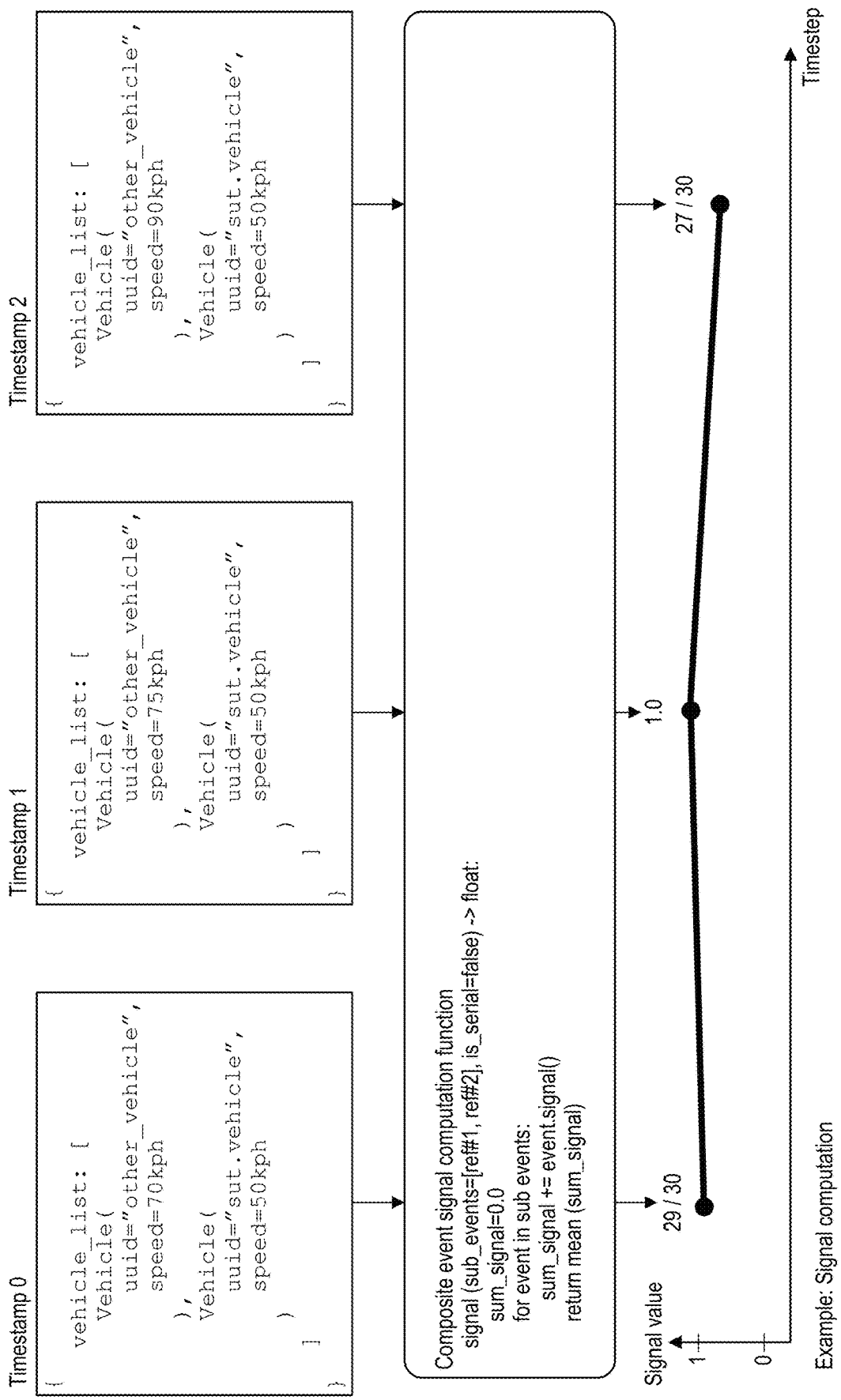
FIG. 31 illustrates determination of values for an example signal computation function for a composite event, according to some embodiments.

FIG. 31 illustrates how composite event signal values may be determined from the values determined in FIGS. 29 and 30. The composite event signal values are obtained by averaging the signal values of the two movement events, resulting in values of 29/30, 1, and 27/30 for the first three time steps.

Figure 32:
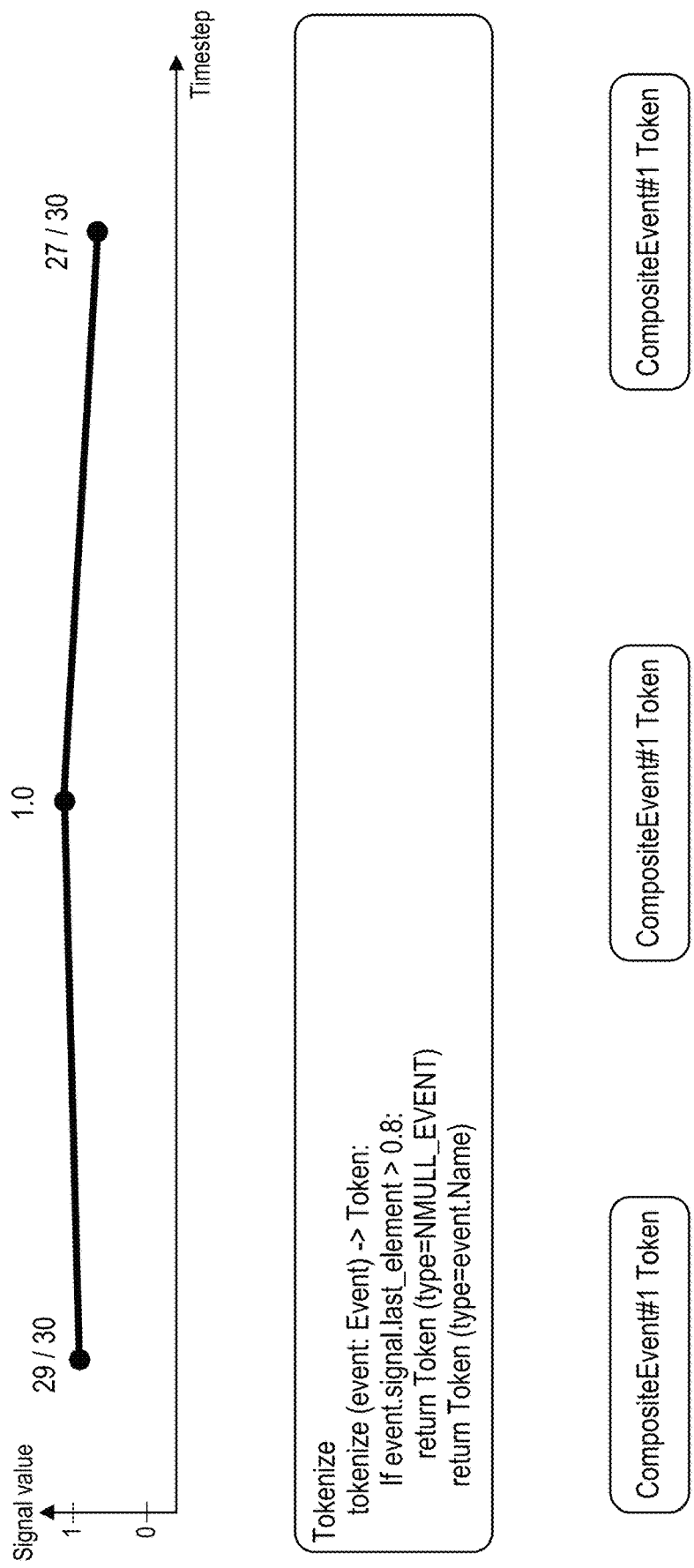
FIG. 32 illustrates an example of token computation for a composite event, according to some embodiments.

FIG. 32 illustrates tokenization for the composite event. Tokenization is run for each top-level event (so in this example, only for the composite event) to compute token values for the top-level event(s). In some embodiments, a simple tokenizer is used that compares the latest signal value to a threshold. In the illustrated example, a threshold value of 0.8 is used, so that a value greater than 0.8 for the signal computation function of the composite event will result in a token that indicates occurrence of the scenario. Each event input to the tokenizer will yield either a "NULL" token to express that the event did not happen, or a token matching that event to express that it did happen.

Figure 33A:
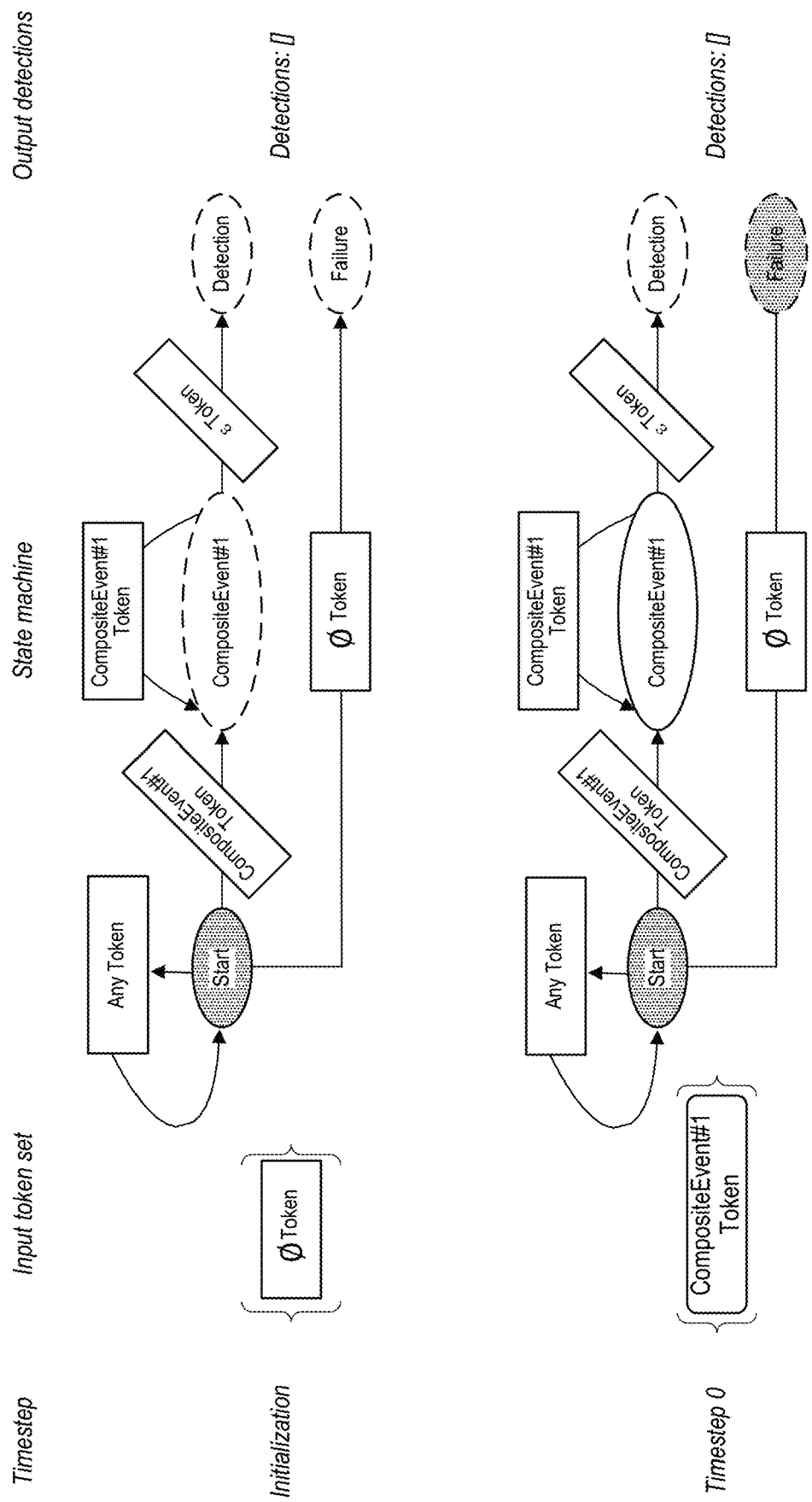
FIGS. 33A-B illustrate four sequential time steps for execution of a state machine, according to some embodiments.
Figure 33B:
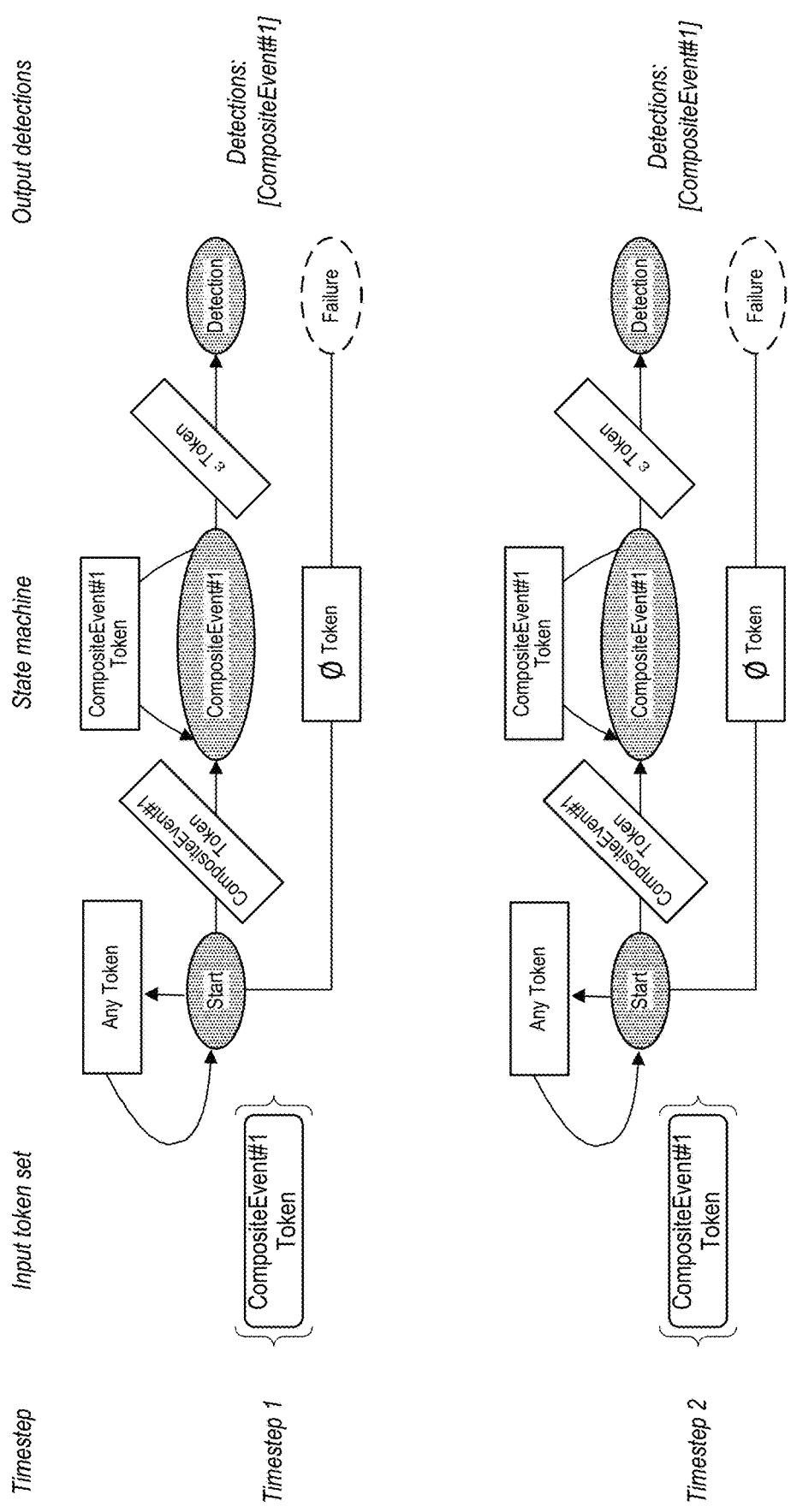

FIG. 33A-B illustrate how the composite event tokens may be provided at each time step to the state machine, which then detects when and if the scenario has occurred. In FIGS. 33A-B, the shaded nodes indicate that the state is active. Notably, the start state is active in each illustrated timestep. As illustrated, at each timestep, the set (no duplicates) of all top-level tokens is fed to the state machine. Tokens are passed in between the state machine's state preparations. "NULL" tokens are removed from the set if there are non-"NULL" tokens present. The state machine is non-deterministic and may transition along multiple edges and be in multiple states (indicated by different shading) at once. Epsilon-moves may be made freely before the next token set is read. If a detection state is active after consuming an input token set, the detector may include that detection in the output detections list.

Embodiments of the present disclosure may be realized in any of various forms. For example, in some embodiments, the disclosed techniques may be realized as a computer-implemented method, a computer-readable memory medium, or a computer system. In other embodiments, the disclosed techniques may be realized using one or more custom-designed hardware devices such as ASICs. In other embodiments, the he disclosed techniques may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms. For example, the computer system may be a personal computer (in any of its various realizations), a workstation, a computer on a card, an application-specific computer in a box, a server computer, a client computer, a hand-held device, a mobile computing device, a tablet computer, a wearable computer, etc.

In some embodiments, a set of computers distributed across a network may be configured to partition the effort of executing a computational method (e.g., any of the method embodiments disclosed herein).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable memory medium storing program instructions which, when executed by a processor, are configured to cause a computing device to:
receive a driving scenario, wherein the driving scenario is described in a scenario description language;
determine a plurality of events in an ordered sequence that corresponds to the driving scenario;
determine, for each event of the plurality of events, a respective signal computation function that quantifies proximity to the respective event;
receive driving data for a plurality of time steps;
determine respective values of each signal computation function evaluated for the driving data at each of the plurality of time steps;
determine, based at least in part on the values of the signal computation functions, whether the driving scenario has occurred for one or more time steps of the plurality of time steps; and
based on the determination whether the driving scenario has occurred for the one or more time steps, either discard a first portion of the driving data or store the first portion of the driving data in the non-transitory computer-readable memory medium.

2. The non-transitory computer-readable memory medium of claim 1, wherein the program instructions are further executable to cause the computing device to:
determine, for each of the values of the signal computation functions, a respective binary indicator that indicates whether the respective value is greater than a predetermined threshold,
wherein determining whether the driving scenario has occurred for the one or more time steps is performed based at least in part on the binary indicators.

3. The non-transitory computer-readable memory medium of claim 1,
wherein the first portion of the driving data comprises driving data for the one or more time steps.

4. The non-transitory computer-readable memory medium of claim 1,
wherein, in determining whether the driving scenario has occurred, the program instructions are executable to cause the computing device to:
determine a state machine for the plurality of events in the ordered sequence;
run the state machine based at least in part on the values of the signal computation functions to determine whether the driving scenario has occurred for the one or more time steps of the plurality of time steps.

5. The non-transitory computer-readable memory medium of claim 1,
wherein the driving data is received in real time, wherein the program instructions are further executable to cause the computing device to:
provide the first portion of the data stored in the non-transitory memory medium to an autonomous driving software program in real time for use in autonomously driving a vehicle.

6. The non-transitory computer-readable memory medium of claim 1,
wherein the driving data are received via one or more sensors of a vehicle.

7. The non-transitory computer-readable memory medium of claim 1, wherein the program instructions are further executable to cause the computing device to:
extract semantic tags from the driving scenario; and
identify the plurality of events in the ordered sequence based on the semantic tags extracted from the driving scenario.

8. The non-transitory computer-readable memory medium of claim 1,
wherein the plurality of events specify one or more of:
a location of a vehicle;
a velocity of the vehicle;
an acceleration of the vehicle;
a respective location for one or more objects, pedestrians, or other vehicles;
a respective velocity for the one or more objects, pedestrians, or other vehicles;
a respective acceleration for the one or more objects, pedestrians, or other vehicles;
a status of a traffic light;
a road condition; and
an environmental condition.

9. The non-transitory computer-readable memory medium of claim 1,
wherein the signal computation functions interpolate between a value of 1 at a position or velocity that corresponds to the respective event and a value of 0 at a position or velocity that differs from the respective event by more than a threshold amount.

10. The non-transitory computer-readable memory medium of claim 1,
wherein, in determining whether the driving scenario has occurred for the one or more time steps, the program instructions are further executable to cause the computing device to:
aggregate the values of the signal computation functions into one or more composite events to obtain respective aggregate values for the one or more composite events; and
determine whether the driving scenario has occurred based on whether the aggregate values are greater than a predetermined threshold.

11. The non-transitory computer-readable memory medium of claim 1,
wherein the program instructions are executable to cause the computing device to determine the plurality of events that corresponds to the driving scenario autonomously by a machine learning algorithm.

12. The non-transitory computer-readable memory medium of claim 1, wherein the program instructions are further executable to cause the computing device to:
modify the first portion of the driving data to comprise a lower fidelity and lower file size; and
store the modified first portion of the driving data in the non-transitory computer-readable memory medium.

13. A method, comprising:
receiving a driving scenario, wherein the driving scenario is described in a scenario description language;
determining a plurality of events in an ordered sequence that corresponds to the driving scenario;
determining, for each event of the plurality of events, a respective signal computation function that quantifies proximity to the respective event;
receiving driving data for a plurality of time steps;
determining respective values of each signal computation function evaluated for the driving data at each of the plurality of time steps;

determining, based at least in part on the values of the signal computation functions, whether the driving scenario has occurred for one or more time steps of the plurality of time steps; and based on the determination whether the driving scenario has occurred for the one or more time steps, determining whether to discard a first portion of the driving data or store the first portion of the driving data in a non-transitory computer-readable memory medium.

14. The method of claim 13, further comprising:

determining, for each of the values of the signal computation functions, a respective binary indicator that indicates whether the respective value is greater than a predetermined threshold, wherein determining whether the driving scenario has occurred for the one or more time steps is performed based at least in part on the binary indicators.

15. The method of claim 13,
wherein determining whether the driving scenario has occurred comprises:

determining a state machine for the plurality of events in the ordered sequence;

running the state machine based at least in part on the values of the signal computation functions to determine whether the driving scenario has occurred for the one or more time steps of the plurality of time steps.

16. The method of claim 13, further comprising:

extracting semantic tags from the driving scenario; and
identifying the plurality of events in the ordered sequence based on the semantic tags extracted from the driving scenario.

17. The method of claim 13,
wherein the plurality of events specify one or more of:
a location of a vehicle;
a velocity of the vehicle;
an acceleration of the vehicle;
a respective location for one or more objects, pedestrians, or other vehicles;
a respective velocity for the one or more objects, pedestrians, or other vehicles;
a respective acceleration for the one or more objects, pedestrians, or other vehicles;
a status of a traffic light;
a road condition; and
an environmental condition.

18. The method of claim 13,
wherein determining whether the driving scenario has occurred for the one or more time steps comprises:
aggregating the values of the signal computation functions into one or more composite events to obtain respective aggregate values for the one or more composite events; and
determining whether the driving scenario has occurred based on whether the aggregate values are greater than a predetermined threshold.

19. The method of claim 13,
modify the first portion of the driving data to comprise a lower fidelity and lower file size; and
store the modified first portion of the driving data in the non-transitory computer-readable memory medium.

20. A vehicle, comprising:
a computing device comprising a processor coupled to a non-transitory computer-readable memory medium, wherein the computing device is configured to direct driving behavior of the vehicle,
wherein the non-transitory computer-readable memory medium comprises program instructions executable by the processor to cause the computing device to:
receive a driving scenario, wherein the driving scenario is described in a scenario description language;
determine a plurality of events in an ordered sequence that corresponds to the driving scenario;
determine, for each event of the plurality of events, a respective signal computation function that quantifies proximity to the respective event;
receive driving data for a plurality of time steps;
determine respective values of each signal computation function evaluated for the driving data at each of the plurality of time steps;
determine, based at least in part on the values of the signal computation functions, whether the driving scenario has occurred for one or more time steps of the plurality of time steps; and
based on the determination whether the driving scenario has occurred for the one or more time steps, either discard a first portion of the driving data or store the first portion of the driving data in the non-transitory computer-readable memory medium.

* * * * *